(12) United States Patent
Unnervik et al.

(10) Patent No.: US 11,541,781 B2
(45) Date of Patent: Jan. 3, 2023

(54) METHODS AND DEVICES FOR VEHICLE SAFETY MECHANISMS

(71) Applicant: Intel Corporation, Santa Clara, CA (US)

(72) Inventors: Alexander Carl Unnervik, Munich (DE); Daniel Pohl, Puchheim (DE); Maik Sven Fox, Rheinstetten (DE); Ignacio Alvarez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 307 days.

(21) Appl. No.: 16/777,934

(22) Filed: Jan. 31, 2020

(65) Prior Publication Data

US 2020/0164771 A1 May 28, 2020

(51) Int. Cl.
| | | |
|---|---|---|
| *B60N 2/02* | (2006.01) | |
| *B60N 2/10* | (2006.01) | |
| *B60N 2/14* | (2006.01) | |
| *B60R 21/0134* | (2006.01) | |

(52) U.S. Cl.
CPC ............. *B60N 2/0276* (2013.01); *B60N 2/10* (2013.01); *B60N 2/14* (2013.01); *B60R 21/0134* (2013.01)

(58) Field of Classification Search
CPC .......... B60N 2/0276; B60N 2/10; B60N 2/14; B60N 21/0134
USPC .......................................................... 701/49
See application file for complete search history.

(56) References Cited

U.S. PATENT DOCUMENTS

| | | | | |
|---|---|---|---|---|
| 9,975,458 | B2* | 5/2018 | Takeuchi | B60N 2/39 |
| 10,195,988 | B1* | 2/2019 | Garza | G08B 21/24 |
| 10,518,674 | B1* | 12/2019 | Aikin | B60N 2/4207 |
| 2018/0111574 | A1* | 4/2018 | Okamura | B60R 21/0132 |
| 2018/0281625 | A1* | 10/2018 | Akaba | B60R 21/0134 |
| 2019/0241139 | A1* | 8/2019 | Kanegae | B60R 21/01512 |
| 2019/0344740 | A1* | 11/2019 | Hakki | B60R 21/0132 |
| 2020/0215938 | A1* | 7/2020 | Tanabe | B60N 2/14 |

OTHER PUBLICATIONS

Yan et al.; "SECOND: Sparsely Embedded Convolutional Detection"; Sensors; Oct. 6, 2018; 17 pages; vol. 18, No. 3337.
Badino et al.; "The Stixel World—A Compact Medium Level Representation of the 3D World," in DAGM: Joint Pattern Recognition Symposium; Sep. 2009; 11 pages; Jena, Germany.
Lefèvre et al.; "A survey on motion prediction and risk assessment for intelligent vehicles," ROBOMECH Journal, Aug. 1, 2014, 15 pages; vol. 1, No. 1.
Wuthishuwong et al; "Safe trajectory planning for autonomous intersection management by using vehicle to infrastructure communication," EURASIP Journal on Wireless Communications and Networking, Jan. 2015; 12 pages.
Elbanhawi et al.; "In the Passenger Seat: Investigating Ride Comfort Measures in Autonomous Cars"; IEEE Intelligent Transportation Systems Magazine;Jul. 24, 2015; 14 pages.

* cited by examiner

*Primary Examiner* — Tyler D Paige
(74) *Attorney, Agent, or Firm* — Viering, Jentschura & Partner mbB

(57) ABSTRACT

According to various aspects, a controller includes one or more processors configured to: determine when a predicted event occurs, at which a velocity of a vehicle is changed; and provide an instruction for a reorientation of one or more seats of the vehicle based on when the predicted event occurs.

19 Claims, 15 Drawing Sheets

FIG. 3
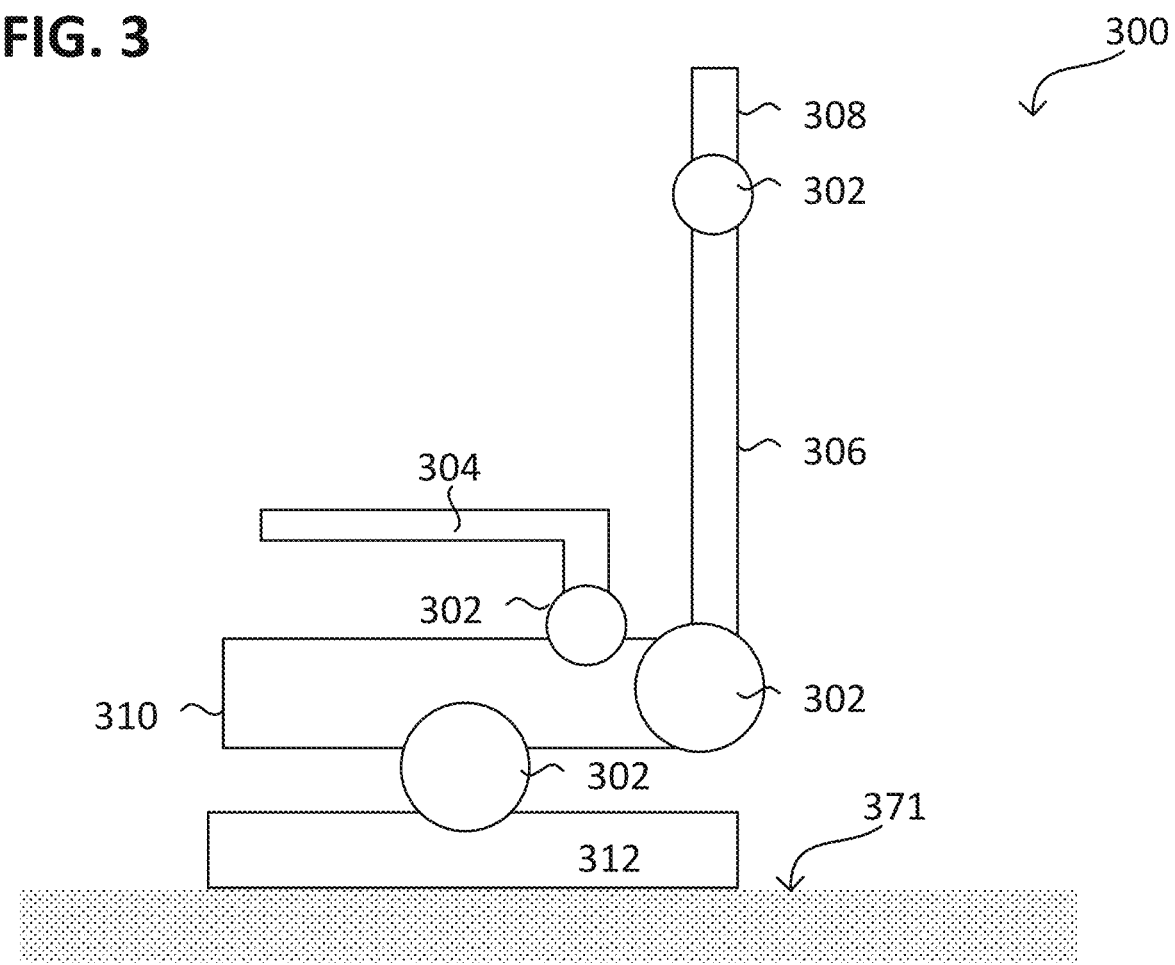
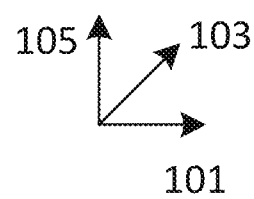

FIG. 6
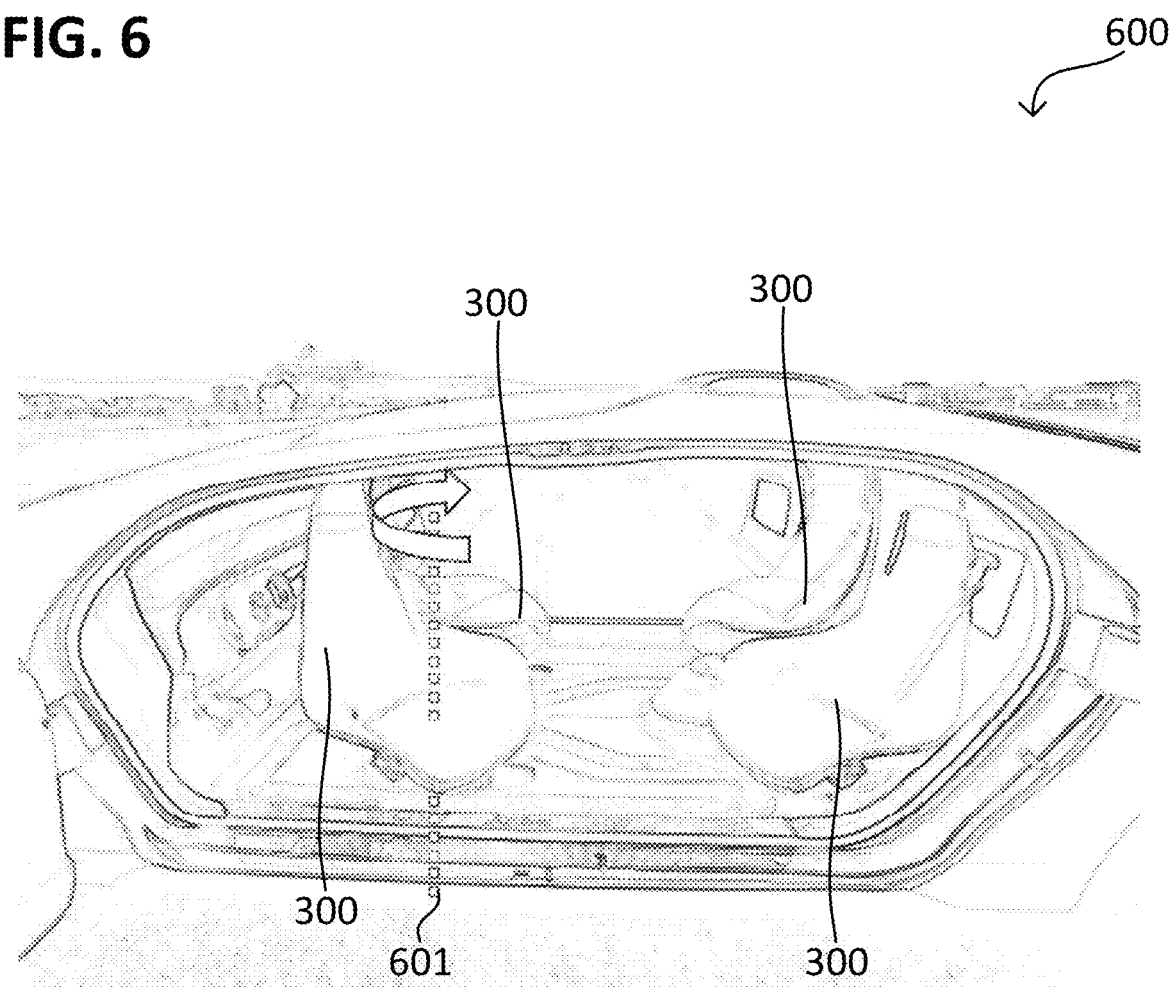
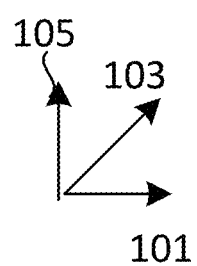

METHODS AND DEVICES FOR VEHICLE SAFETY MECHANISMS

TECHNICAL FIELD

Various aspects of this disclosure generally relate to a controller, a vehicle, and non-transitory computer-readable media, and more particularly relate to a controller, a vehicle, and non-transitory computer readable media for implementing a vehicular control mechanism (e.g., a vehicular safety mechanism).

BACKGROUND

Current safety attachment and safety-related systems in traditional vehicles are designed for static postures. They are usually forward facing, seated, and focused on immobile positions. For example, a vehicle occupant-restraint system may utilize one or more airbags as an active safety mechanism designed to inflate extremely quickly towards the driver during a collision. By way of contrast, a vehicle occupant-restraint system may utilize seat belts as a passive safety mechanism to hold the driver in the seat during a collision.

Older vehicles often employ a mechanical trigger to actuate the active safety mechanism. However, more modern vehicles employ other sensors and computing methods to actuate the active safety mechanism. With the exception of an increasing number and type of airbags, the basic principles of such active safety mechanisms have been substantially unchanged over the last few decades.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 3 shows a vehicle in accordance with various aspects of the present disclosure;

FIGS. 6 to 8 respectively show a vehicle in accordance with various aspects of the present disclosure;

DESCRIPTION

Figure 1:
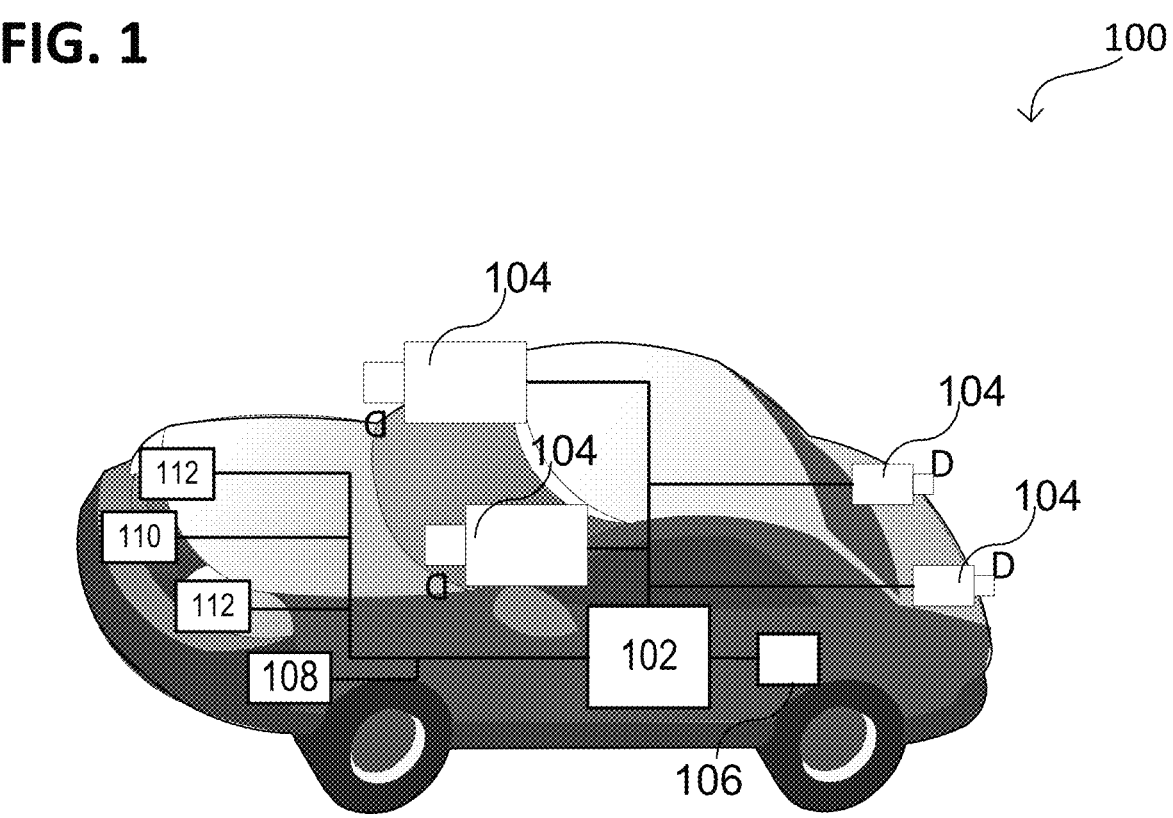
FIG. 1 shows an exemplary vehicle in accordance with various aspects of the present disclosure.

The following detailed description refers to the accompanying drawings that show, by way of illustration, exemplary details and embodiments in which aspects of the present disclosure may be practiced.

The word "exemplary" is used herein to mean "serving as an example, instance, or illustration." Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]," "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)," "collection (of)," "series (of)," "sequence (of)," "grouping (of)," etc., in the description and in the claims, if any, refer to a quantity equal to or greater than one, i.e., one or more. The phrases "proper subset," "reduced subset," and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data," however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object (e.g., a ground vehicle). By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, as described above, which is configured to traverse the ground (e.g., on a street, on a road, on a track, on one or more rails, off-road, etc).

The term "autonomous vehicle" may describe a vehicle capable of implementing at least one navigational change without driver input, when the vehicle is in an autonomous driving mode. A navigational change may describe or include a change in one or more of steering, braking, or acceleration/deceleration of the vehicle. A vehicle may be described as autonomous even when the vehicle is not fully automatic (for example, fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g., level 0 (illustratively, substantially no driving automation), to a maximum level, e.g., level 5 (illustratively, full driving automation).

The term "model" may, for example, used herein may be understood as any kind of algorithm, which provides output data from input data (e.g., any kind of algorithm generating or calculating output data from input data). A model may be understood as a data-based (e.g., digital and/or virtual) representation of an original, e.g. a physical object (e.g., a machine), a process (e.g., a control procedure or a process flow), or a whole system, environment, region, among others. The act of forming the model (the so-called "modelling," e.g., the mapping of the original onto the model) may include abstracting, a parametrization of and/or simplifying the original. For example, the model may include physical information (e.g., length, distance, weight, volume, composition, etc.), motion-related information (e.g., position, orientation, direction of motion, acceleration, speed of motion, etc.), logical information (e.g., links, sequence, couplings, interrelations, dependencies, etc.), time-related information (e.g., time, total duration, frequency, period duration, etc.) and/or functional information (e.g., current intensity, effect, characteristic diagram or curve, force, degree of freedom, etc.) about the original.

As described herein, reference will be made to an autonomous vehicle for demonstrative purposes, which is not intended to be limiting. The references made to the autonomous vehicle may analogously apply to a non-autonomous vehicle.

In the following, reference will also be made to various functions, methods and aspects thereof for demonstrative purposes, which are not intended to be limiting. One or more of the functions, methods and/or aspects thereof may be performed by one or more processors (e.g., implementing a controller) of the vehicle. Additionally or alternatively, one or more of the functions, methods and/or aspects thereof may be performed by one or more processors (e.g., implementing a controller) externally from the vehicle (e.g., a controller in communicative connection with the vehicle). For example, the one or more processors may be configured to instruct the vehicle (e.g., via the communicative connection) or component(s) thereof to perform the functions, methods and/or aspects thereof. For example, providing an instruction may be performed to instruct.

FIG. 1 shows an exemplary vehicle, namely vehicle 100, in accordance with various aspects of the present disclosure. In some aspects, vehicle 100 may include one or more processors 102, one or more image acquisition devices 104, one or more position sensors 106, one or more speed sensors 108, one or more radar sensors 110, and/or one or more Light Detection and Ranging (LIDAR) sensors 112.

In some aspects, vehicle 100 may include an onboard system 200 (as described with respect to FIG. 2 below). It is appreciated that vehicle 100 and onboard system 200 are exemplary in nature and may thus be simplified for explanatory purposes. Locations of elements and relational distances (as discussed above, the figures are not to scale) are provided as examples and are not limited thereto. The onboard system 200 may include various components depending on the requirements of a particular implementation.

Figure 2:
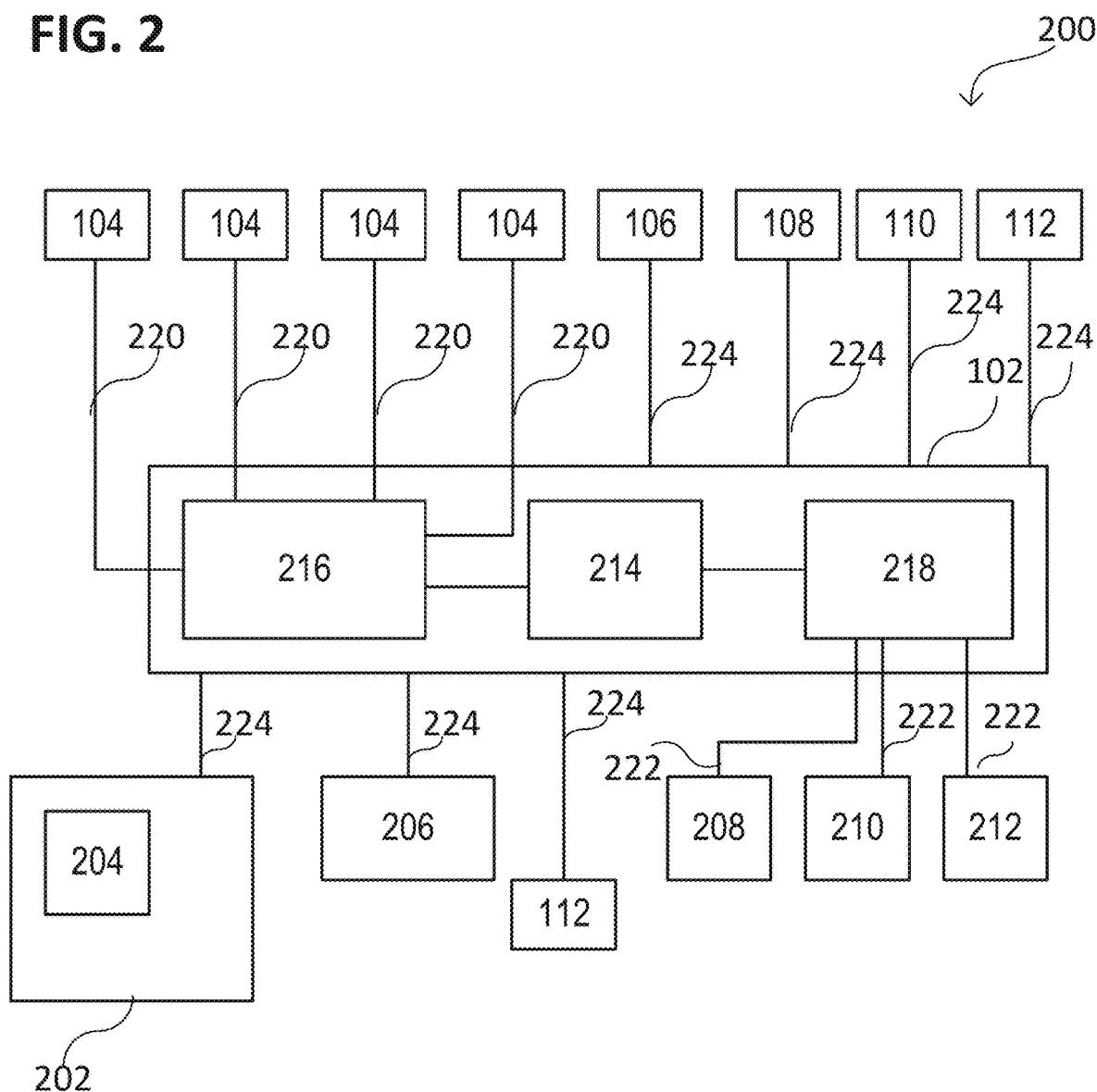
FIG. 2 shows various exemplary electronic components of a vehicle in accordance with various aspects of the present disclosure.

FIG. 2 shows various exemplary electronic components of a vehicle, namely onboard system 200, in accordance with various aspects of the present disclosure. In some aspects, onboard system 200 may include one or more processors 102, one or more image acquisition devices 104 (e.g., one or more cameras), one or more position sensors 106 (e.g., Global Navigation Satellite System (GNSS), Global Positioning System (GPS), among others) one or more speed sensors 108, one or more radar sensors 110, and/or one or more LIDAR sensors 112. According to at least one aspect, onboard system 200 may also include one or more memories 202, one or more map databases 204, one or more user interfaces 206 (e.g., a display, a touch screen, a microphone, a loudspeaker, one or more buttons and/or switches, etc.), one or more wireless transceivers 208, 210, 212, and/or one or more antenna systems.

In at least one aspect, onboard system 200 may further include one or more data interfaces communicatively connecting the one or more processors 102 to one or more components of the on board system 200. Onboard system 200 may, for example, include a first data interface, a second data interface, and a third data interface.

In some aspects, the first data interface may include any wired and/or wireless first link 220 or first links 220 configured to provide image data acquired by the one or more image acquisition devices 104 to the one or more processors 102 (e.g., to the image processor 216).

In some aspects, the second data interface may include any wired and/or wireless second link 222 or second links 222 configured to transmit radio transmitted data acquired by wireless transceivers 208, 210, 212 to the one or more processors 102 (e.g., to the communication processor 218). The wireless transceivers 208, 210, 212 may, in some aspects, be coupled to the one or more processors 102 (e.g., to the communication processor 218) via, for example, a the second data interface. The second data interface may include any wired and/or wireless second link 222 or second links 222 configured to transmit radio transmitted data acquired by wireless transceivers 208, 210, 212 to the one or more processors 102 (e.g., to the communication processor 218).

In some aspects, the third data interface may include any wired and/or wireless third link 224 or third links 224. The one or more memories 202 as well as the one or more user interfaces 206 may be coupled to each of the one or more processors 102 (e.g., via the third data interface). The third data interface may include any wired and/or wireless third link 224 or third links 224. The third data interface may also couple the position sensor 106, the speed sensor 108, the one or more radar sensors 110 and the one or more LIDAR sensors 112 to at least one of the one or more processors 102.

Furthermore, the position sensor 106 may be coupled to each of the one or more processors 102, e.g., via the third data interface.

The onboard system 200 may include a communication bus for communication between various electronic components of a vehicle (e.g., for transmitting data). For example, the communication bus may include wired and/or wireless first link 220 or first links 220, wired and/or wireless second link 222 or second links 222, and/or wired and/or wireless third link 224 or third links 224. The communication bus may be configured according to a Controller Area Network (CAN) communication protocol or according to an Ethernet communication protocol. Parts of the communication bus may be wired. Additionally or alternatively, parts of the communication bus may be wireless.

In some aspects, the one or more processors 102 may include an application processor 214, an image processor 216, a communication processor 218, and/or any other suitable processing device. Image acquisition device(s) 104 may include any number of image acquisition devices and/or components depending on the requirements of a particular application. Image acquisition device(s) 104 may include one or more image capture devices (e.g., cameras, CCDs (charge coupling devices), or any other type of image sensor.

Each processor 214, 216, 218 of the one or more processors 102 may include various types of hardware-based processing devices. By way of example, each processor 214, 216, 218 may include a microprocessor, pre-processors (such as an image pre-processor), graphics processors, a central processing unit (CPU), support circuits, digital signal processors, integrated circuits, memory, and/or any other types of devices suitable for running applications and for image processing and analysis. In some aspects, each processor 214, 216, 218 may include any type of processor, such as a single or multi-core processor, mobile device microcontroller, central processing unit, among others. These processor types may each include multiple processing units with local memory and instruction sets. Such processors may include video inputs for receiving image data from multiple image sensors and may also include video out capabilities.

In some aspects, the onboard system 200 may further include one or more components, such as a speed sensor 108 (e.g., a speedometer) for measuring a speed of the vehicle 100. The onboard system 200 may also include one or more accelerometers (either single axis or multiaxis) (not shown) for measuring accelerations of the vehicle 100 along one or more axes. The onboard system 200 may further include additional sensors or different sensor types such as an ultrasonic sensor, a thermal sensor, one or more radar sensors 110, one or more LIDAR sensors 112 (which may be integrated in the head lamps of the vehicle 100), among others. The radar sensors 110 and/or the LIDAR sensors 112 may be configured to provide pre-processed sensor data, such as radar target lists or LIDAR target lists. The third data interface may couple the speed sensor 108, the one or more radar sensors 110 and the one or more LIDAR sensors 112 to at least one of the one or more processors 102.

Any of the processors 214, 216, 218 disclosed herein may be configured to perform certain functions in accordance with program instructions which may be stored in a memory of the one or more memories 202. In other words, a memory of the one or more memories 202 may store software that, when executed by a processor (e.g., by the one or more processors 102), controls the operation of the system, e.g., the onboard system 200. A memory of the one or more memories 202 may store one or more databases and image processing software, one or more models, as well as a trained system, such as a neural network, or a deep neural network, for example. The one or more memories 202 may include any number of random access memories, read only memories, flash memories, disk drives, optical storage, tape storage, removable storage, and other types of storage.

The one or more memories 202 may store data, e.g., in a database or in any different format, that, e.g., indicates a location of known landmarks. The one or more processors 102 may process sensory information (such as images, radar signals, depth information from LIDAR or stereo processing of two or more images) of the environment of the vehicle 100 together with position information, such as a GPS coordinate, a vehicle's ego-motion, etc., to determine a current location of the vehicle 100 relative to the known landmarks, and refine the determination of the vehicle's location. Certain aspects of this technology may be included in a localization technology, such as a mapping and routing model.

The map database 204 may include any type of database storing map data (e.g., digital map data) for the vehicle 100 (e.g., for the onboard system 200). The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including, for example, names associated with any of the stored features. In such aspects, a processor of the one or more processors 102 may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers.

The wireless transceivers 208, 210, 212 may, in some aspects, be configured according to the same radio communication protocols or standards, different radio communication protocols or standards, or any combination of radio communication protocols or standards. By way of example, a wireless transceiver (e.g., a first wireless transceiver 208) may be configured in accordance with a short-range mobile radio communication standard (e.g., Bluetooth, Zigbee, among others). As another example, a wireless transceiver (e.g., a second wireless transceiver 210) may be configured in accordance with a medium-range or wide-range mobile radio communication standard (e.g., 3G, Universal Mobile Telecommunications System (UMTS), 4G, Long Term Evolution (LTE), and/or 5G mobile radio communication standard in accordance with corresponding 3GPP ($3^{rd}$ Generation Partnership Project) standards, among others). As a further example, a wireless transceiver (e.g., a third wireless transceiver 212) may be configured in accordance with a Wireless Local Area Network (WLAN) communication protocol or standard (e.g., IEEE 802.11, 802.11a, 802.11b, 802.11g, 802.11n, 802.11p, 802.11-12, 802.11ac, 802.11ad, 802.11ah, among others). The one or more wireless transceivers 208, 210, 212 may be configured to transmit signals via an antenna system over an air interface.

One or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and/or other protocols.

Such transmissions may also include communications (e.g., one-way or two-way) between the vehicle 100 and one or more other vehicles (e.g., target vehicles) in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

Furthermore, the onboard system 200 may include a driving model, e.g., implemented in an advanced driving assistance system (ADAS) and/or a driving assistance, and automated driving system. By way of example, the onboard system 200 may include (e.g., as part of the driving model) a computer implementation of a formal model, such as a safety driving model. A safety driving model may be or include a mathematical model formalizing an interpretation of applicable laws, standards, policies, etc. that are applicable to self-driving the vehicle 100 (e.g., a ground vehicle), when the vehicle 100 is set to an autonomous driving mode. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving vehicle (e.g., autonomous self-driving vehicle) correctly implements the interpretation of the law. A safety driving model, illustratively, may be or include a mathematical model for safety assurance that enables identification and performance of proper responses to dangerous situations such that self-perpetrated collisions can be avoided.

A safety driving model may implement logic to apply driving behavior rules such as the following five rules:

Do not hit someone from behind.
Do not cut-in recklessly.
Right-of-way is given, not taken.
Be careful of areas with limited visibility.
If you can avoid a collision without causing another one, you must do it.

It is to be noted that these rules are not limiting and not exclusive and can be amended in various aspects as desired. The rules rather represent a social driving contract that might be different depending on the region and may also develop over time. While these five rules are currently applicable in most of the countries they might not be complete and may be amended.

As described above, the vehicle 100 may include the onboard system 200 as also described with reference to FIG. 2.

The vehicle 100 may include the one or more processors 102 e.g. integrated with or separate from an engine control unit (ECU) of the vehicle 100.

The onboard system 200 may, in general, be configured to generate data to control or assist to control the ECU and/or other components of the vehicle 100 to directly or indirectly control the driving of the vehicle 100.

In the following, a method for reorienting one or more seats of the vehicle 100 (also referred to as reorienting method) may be provided. Reorienting a seat may include changing a direction of the seat. Changing a direction of the seat may include a rotational movement of the seat. Reorienting a seat may include changing an orientation of the seat.

The onboard system 200 may further include one or more actuators that are controlled by the one or more processors 102 of the vehicle 100, as described in more detail in the following (as described below with respect to FIG. 3). At least some of the one or more actuators may, for example, be configured to actuate motions of one or more seats of the vehicle 100 or to actuate inflation of one or more airbags of the vehicle.

FIG. 3 shows an exemplary view of a vehicle, namely vehicle 100, in accordance with various aspects of the present disclosure. As provided therein, vehicle 100 may include one or more seats 300 in accordance with various aspects of the present disclosure. Each of the one or more seats 300 may be located (e.g., disposed) in a cabin of the vehicle 100.

Although aspects of the present disclosure will be described in association with a single seat, any other number of seats may be provided in alternative implementations (e.g., for performing the reorienting method as detailed herein). Although aspects of the present disclosure will be described based on Cartesian coordinates 101, 103, 105, any other coordinate system may be provided in alternative implementations to describe the same aspects. The coordinates of different coordinate systems may be converted into each other without deviating from the described aspects.

The following refers to the configuration and operation of one seat 300 as an example intended for demonstrative purposes, and not intended to be limiting. The vehicle 100 may include one or more seats 300 (e.g., identical to each other, at least partially identical to each other, different from each other, etc.). The references made to seat 300 may in analogy apply to each of multiple seats and/or seats that have another configuration (e.g., seat that have more or less joints, more or less actuators, more or less components, have another shape and the like).

In some aspects, the seat 300 may be a one-person seat (e.g., a bucket seat) or a multiple-person seat (e.g., a bench seat, also referred to as bench). Each seat 300 of the vehicle 100 may be mounted to a base 371 of the vehicle 100 (also referred to as vehicle base). For example, the base of the vehicle 100 may include or be formed from the chassis 371 of the vehicle 100 (e.g., the floorpan 371 of the vehicle 100). For example, multiple seats 300 of the vehicle 100 may be coupled to each other by the vehicle base.

The seat 300 (e.g., a bucket seat) may, in some aspects, include multiple components (also referred to as seat components). Seat components may, for example, be coupled to each other by joints 302. Examples of the seat components include one or more armrests 304, a backrest 306, a headrest 308, a seat base 310, and a seat stand 312. The seat base 310 may be coupled (via joint 302) to the backrest 306, the seat stand 312 and optionally to the headrest 308.

When the seat 300 is a bench seat, the seat may, in some aspects, not have to include the backrest 306 and/or the headrest 308. By way of contrast, the backrest 306 and/or the headrest 308 may be included, e.g., when the seat 300 is a bench seat.

In some aspects, each of the joints 302 may include a bearing (e.g., a bearing configured for radial motion (also referred to as rotational movement), or for linear motion (also referred to as translational movement) or a mixture thereof). The joint 302 coupling the seat base 310 with the seat stand 312 may, for example, include a translational bearing (e.g., a seat track), a rotational bearing, a ball joint or the like.

Each of the joints 302 may couple at least two of the seat components to each other (e.g., in a movable manner to each other). When at least two of the seat components are coupled in a movable manner to each other, they can be moved relative to each other. Each of the joints 302 may be configured to provide one or more degrees of freedom for moving the at least two seat components relative to each other (e.g., one or more rotational movements and/or one or more translational movements). Each of the joints 302 include one or more actuators, which are configured to drive the movement. Examples of the one or more actuators may include: an electrical motor (e.g., a servomotor), a pneumatic actuator, or a hydraulic actuator.

Optionally, one or more of the joints may include one or more sensors to determine the actual state of the relative position (e.g., relative position) of the seat components coupled by the joint.

As provided herein, movement of each of the seat components will be described as movement relative to the vehicle base serving as reference, which is not intended to be limiting. For example, the movement may be described with another reference or in other coordinates, if desired. Thus, the vehicle base 371 (or at least the floorpan of the vehicle 100) may be regarded as being stationary relative to the axes 101, 103, 105. Axis 101 may, for example, be at a tangent to the trajectory of the vehicle 100 (e.g., the driving direction). The seat 300 may protrude from the vehicle base 371 of the vehicle 100 along axis 105. For example, if the vehicle 100 rest on a horizontal plane, axis 105 may be vertical. Axis 103 may, for example, be perpendicular to each of axes 101, 105. Axis 103 may, for example, be parallel to an axis of the one or more wheels of the vehicle 100 (e.g., their rotation axis).

For a stationary vehicle 100, axis 105 may be parallel to the force of gravity. For a moving vehicle 100, axis 105 may deviate therefrom due to the suspension and/or a slanted road. In reference to the coordinates of the vehicle 100, axis 105 may be referred to as vertical axis 105 for a facilitated understanding (independent from the orientation of the vehicle 100).

Various aspects as disclosed herein may include reorienting the seat 300 (also referred to as seat reorientation). The seat reorientation may include a rotational movement of the seat base 310 (e.g., a rotational movement of at least about axis 105 and/or about one or more of axes 103, 101). The references made herein with respect to the seat reorientation may, said more generally, apply analogously to a change of the position of the seat or components thereof. Examples for the change of the position of the seat may include the reorientation (e.g., a rotational movement (changing a direction)) of the seat or components thereof, and/or a translational movement of the seat or components thereof.

The seat reorientation may optionally include a translational movement of the seat base 310 (e.g., a translational movement along axis 101 and/or along axis 103). The seat reorientation may optionally include a movement of one or more of the following seat components: one or more armrests 304, the backrest 306, and/or the headrest 308.

Figure 4:
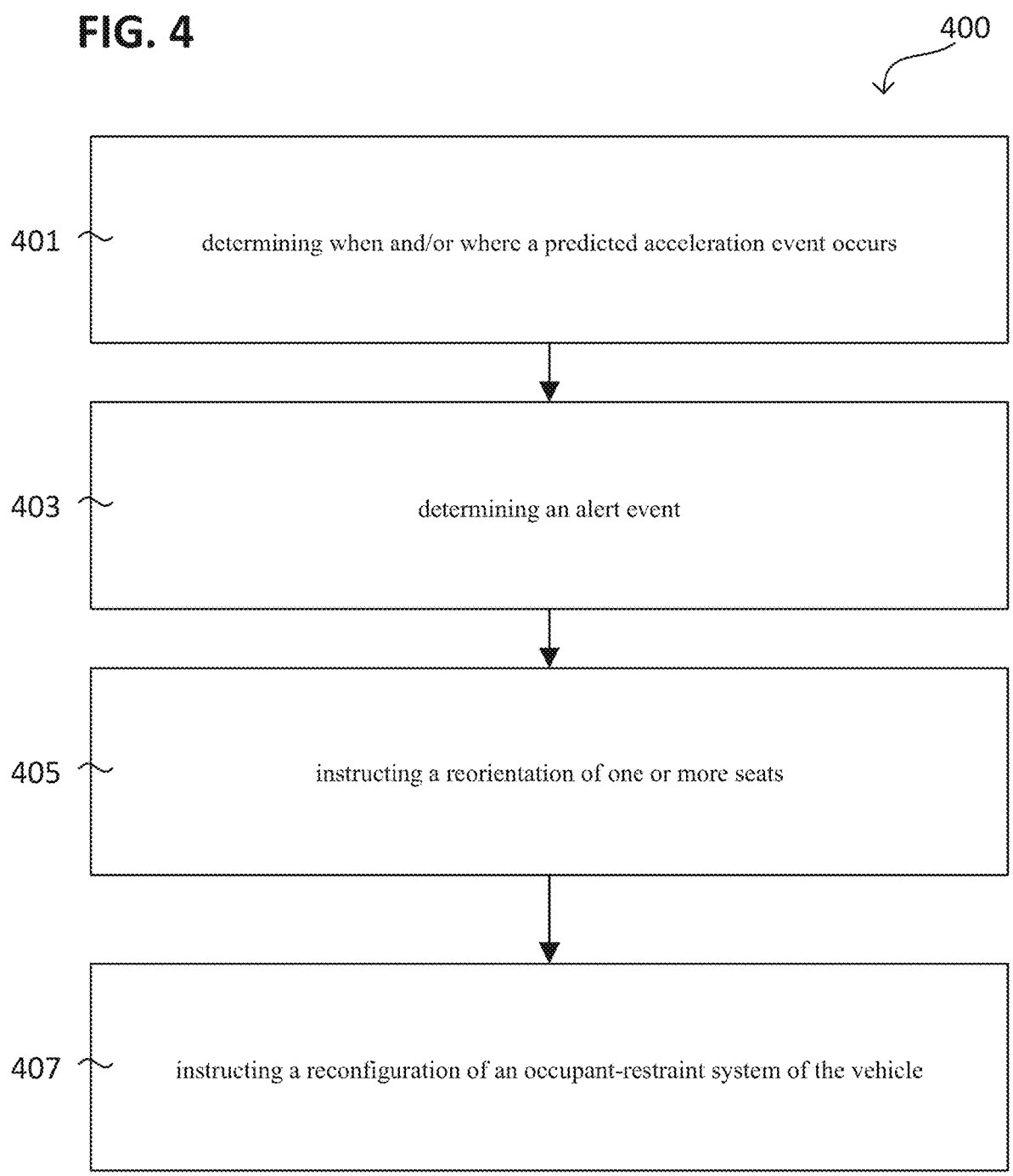
FIGS. 4 and 5 respectively show a method in accordance with various aspects of the present disclosure.

FIG. 4 shows a method, namely method 400, in accordance with various aspects of the present disclosure. In some aspects, the one or more processors 102 of the vehicle 100 may be configured to implement the following aspects and methods.

The method 400 may include, in 401, determining when and/or where a predicted event (e.g., acceleration event) occurs, at which a velocity of a vehicle 100 (e.g. one or more vector components of the velocity) is changed. The change of the velocity of the vehicle 100 may, for example, be in response to accelerating the vehicle 100.

The velocity v of the vehicle 100 may be changed, when $\Delta v/\Delta t \neq 0$, wherein t denotes the time, $\Delta v$ denotes the change of the velocity, and $\Delta t$ denotes a time interval. The term $\Delta v/\Delta t$ denotes the acceleration. In mechanics, acceleration is the rate of change of the velocity of an object with respect to time. The acceleration and the velocity are vector quantities. That is, they have magnitude (also referred to as absolute value) and direction. An acceleration opposing the direction of velocity is also referred to as deceleration or as negative acceleration. An acceleration into the direction of the velocity is also referred to as positive acceleration.

Accelerating the vehicle may change one or more vector components of the velocity, e.g., thereby changing the direction of the velocity and/or the absolute value of the velocity. Examples of accelerating the vehicle may include decreasing the absolute value of the velocity (that is removing kinetic energy from the vehicle, e.g., by breaking), increasing the absolute value of the velocity (that is adding kinetic energy to the vehicle, e.g., by accelerating) and/or changing the direction of the velocity (e.g., by steering). For example, the absolute value of the velocity before and after the acceleration event may differ from each other (e.g., while the direction of the velocity is substantially identical or not). For example, the direction of the velocity before and after the event may differ from each other (e.g., while the absolute value of the velocity is substantially identical or not). As another example, the absolute value of the velocity before the acceleration event may be zero or differ from zero. For example, the absolute value of the velocity after the acceleration event may be zero or differ from zero.

Generally, various acceleration events may cause a change in the velocity of a vehicle 100. Examples of the acceleration event may include: one or more collisions of the vehicle (that may add kinetic energy to the vehicle or remove kinetic energy from the vehicle), the vehicle entering a curved part of the trajectory of the vehicle, the vehicle leaving a curved part of the trajectory of the vehicle, the vehicle breaking, speeding up the vehicle, and the like.

Examples of the acceleration event may include a dangerous acceleration event and/or a harmless acceleration event. Illustratively, the dangerous acceleration event represents an acceleration that may result in a serious risk of injury (also referred to as injury risk). Illustratively, the harmless acceleration event represents an acceleration that may result in a negligible risk of injury. For example, the acceleration event may include, in a first phase, the vehicle 100 breaking in order to reduce the collision impact and, in a second phase, the vehicle 100 colliding.

For example, the acceleration event may be predicted based on the trajectory of the vehicle 100, which may, for example, be a predicted trajectory. This enables adaptation of the orientation of the seat 300 right in time with breaking, speeding up or steering the vehicle 100. Such an acceleration event may be a harmless acceleration event. In contrast thereto, a collision (e.g., an accident) or the like may be a dangerous acceleration event.

The acceleration of the dangerous acceleration event (e.g., in case of a collision as acceleration event) may be a multiple of the gravity constant (also referred to as $g_c$), e.g., more than about $2 \cdot g_c$, e.g., more than about $3 \cdot g_c$, e.g., more than about $4 \cdot g_c$, e.g., more than about $5 \cdot g_c$, e.g., more than about $10 \cdot g_c$, e.g., more than about $50 \cdot g_c$, e.g., more than about $100 \cdot g_c$. For example, a collision as acceleration event may cause an acceleration of more than about $10 \cdot g_c$. A vehicle 100 collides at 50 km/h (kilometers per hour) with a solid wall, compressing the crumple zone of the vehicle 100 by 50 cm (centimeter). The corresponding acceleration is about $20 \cdot g_c$.

The acceleration of the harmless acceleration event (e.g., in case of a turn as acceleration event) may be less than about $2 \cdot g_c$, e.g., less than about $1 \cdot g_c$, e.g., less than about $0.5 \cdot g_c$, e.g., less than about $0.25 \cdot g_c$, e.g., less than about $0.1 \cdot g_c$. For example, a slow turn as acceleration event may cause an acceleration of less than about $0.1 \cdot g_c$. For example, a fast turn as acceleration event may cause an acceleration of about $0.5 \cdot g_c$.

Determining when and/or where the predicted event occurs may be performed, when the vehicle 100 is in an autonomous driving mode and/or when the vehicle 100 is driven by a person.

Additionally or alternatively to 401, the method 400 may include, in 403, determining an alert event. The alert event may occur in a vicinity of the vehicle and/or indicate a lack of attention of a driver of the vehicle (e.g., regarding the vicinity). Determining the alert event may be performed, when the vehicle 100 is driven by a person.

Examples of the alert event in the vicinity of the vehicle may include: an obstacle in the way of the vehicle 100, an object approaching or entering the trajectory of the vehicle, a collision in the vicinity of the vehicle, the vehicle approaching a road sign, the vehicle approaching a traffic signal, and the like. For example, the trajectory of the vehicle and/or one or more objects in the vicinity of the vehicle may be predicted. Based on such a prediction, it may be determined, if a collision occurs.

Examples of the alert event indicating a lack of attention of a driver may include: a certain time of inactivity of the driver, reduced breathing frequency of the driver, the driver looking away from the road, the driver falling asleep, and the like.

A further example of the alert event indicating a lack of attention of a driver may include: determining an event in the vicinity requiring a reaction of the driver of the vehicle 100, and determining that the driver is not aware of the event.

The method 400 may further include, in 405, instructing a reorientation of one or more seats 300 of the vehicle 100. The instructed reorientation may be based on when and/or where a predicted event occurs. Additionally or alternatively, the instructed reorientation may be based on the alert event.

The method may optionally include, predicting the acceleration event. For example, a collision may be predicted as described in more detail later. Also, a change in the trajectory may be predicted as described in more detail later. For example, the trajectory itself may also be predicted. Based on the predicted trajectory, the event of changing the velocity may be determined. A determination made based on a prediction, may—itself—be regarded as prediction. For example, the event of changing the velocity, which is determined based on a predicted trajectory, may also be a predicted event.

The prediction may, in some aspects refer to a process, which provides a potential version of the future. It may be understood that the future may, but does not have to, happen as predicted. For example, the actual future may deviate from the future as predicted. For example, the predicting may include converting information (e.g., sensed) of the past (past information) into information about the potential version of the future (also referred to as forecast). In other words, predicting may include forecasting. A forecast may refer to a calculation or an estimation which uses data from previous events, combined with recent trends to come up a future event outcome. For example, forecasting may include an extrapolation of past information into the future information.

Additionally or alternatively to the instructing 405 the reorientation of the one or more seats 300 of the vehicle 100, the method 400 may include, in 407, instructing a reconfiguration of an occupant-restraint system of the vehicle 100 based on the acceleration event (e.g., based on when or where the acceleration event occurs).

Illustratively, the method 400 may provide instructions as output, which are directed to reorient a seat (e.g., defining the target reorientation, the direction of reorientation and/or the speed of reorientation). Additionally or alternatively, the method 400 may provide instructions as output, which are directed to reconfiguration of an occupant-restraint system. The instructions may be transmitted to the respective actuators of the vehicle 100, e.g., via the communication bus of the vehicle 100.

Figure 5:
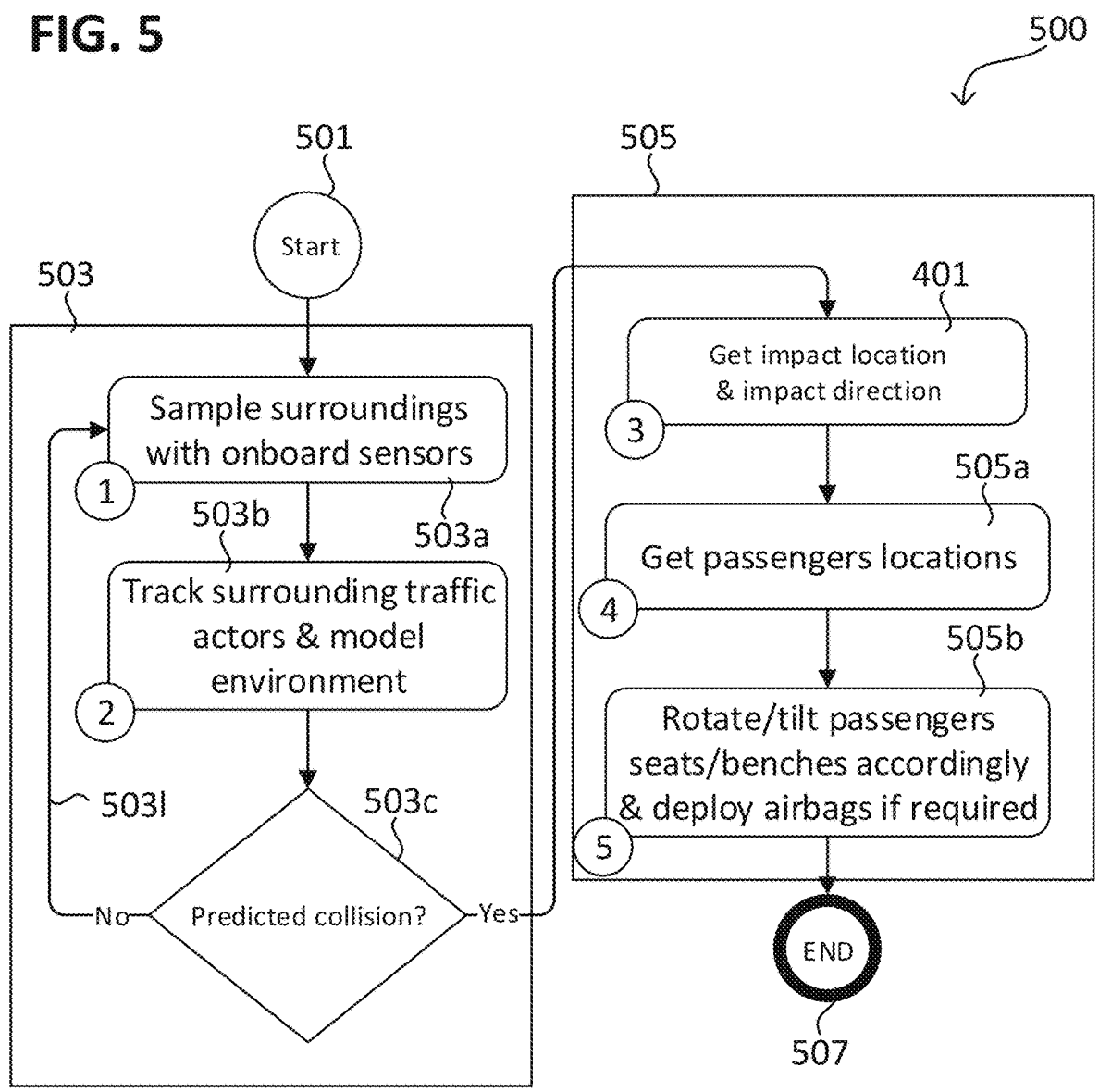

FIG. 5 shows an exemplarily implementation of a method, namely method 400, in accordance with various aspects 500 of the present disclosure. In some aspects, the one or more processors 102 of the vehicle 100 may be configured to implement the following aspects and methods.

According to various aspects, the method 400 may include the creation of dynamic seat poses, involving a rotation of the seat, a turn of the seat to face different directions, and/or an inclination of the seat to various degrees. Dynamic seat poses may be utilized for different activities, such as sleeping, which may be performed by reclining the seat backward (e.g., reclining the seat to a substantially horizontal position).

According to various aspects, method 400 may include a combination of surround perception, accurate detection of static obstacles (as well as tracking and prediction of the vehicle 100) and surrounding actors and objects, and an adequate safety response for the passengers in the vehicle 100 to minimize the risk of injury.

The method may be initialized in 501, e.g., in response to at least one of the following: starting the engine of the vehicle 100, determining a passenger in the vehicle 100, and/or determining a motion of the vehicle 100, and the like.

The method 400 may include, in 503, predicting a collision as acceleration event. Predicting 503 the collision may include, in 503a, sensing the vicinity of the vehicle 100, in 503b, modeling the vicinity of the vehicle 100 (e.g., modeling the surrounding traffic) and, in 503c, determining a collision 503 based on a result of the modeling 503b of the vicinity of the vehicle 100. The modeling of the vicinity of the vehicle 100 may, for example, be based on a result of the sensing 503a of the vicinity of the vehicle 100. The determining of the collision 503 may be based on the result of the modeling (also referred to as vicinity model or as environmental model). The result of the modeling of the vicinity of the vehicle 100 may, for example, include a prediction (as described with respect to prediction 1003c in FIG. 10 below) about the surrounding traffic or at least the predicted trajectory of one or more other vehicles 1100 in the vicinity of the vehicle 100 (also referred to as tracking).

According to various aspects, the sensing 503a of the vicinity of the vehicle 100 and modeling 503b of the vicinity of the vehicle 100 may be performed concurrently or sequentially (e.g., one after another in a continuous loop 503l). A sequential sensing 503a and modeling 503b of the vicinity of the vehicle 100 may ensure that the latest result of the sensing 503a (e.g., available information gathered from the surround perception) is fed to the modeling 503b. If the sensing 503a and modeling 503b are sequential, the vicinity model may be based on the latest available result of the sensing 503a.

Alternatively, the sensing 503a and modeling 503b may be performed parallel to each other, independent from each other and/or with different rates. For example, the modeling 503b may be performed with a higher frequency than the sensing 503a. This case may be desirable when the sensing 503a is not frequently enough. Between two subsequent iterations of the sensing 503a, temporary predictions may be provided and fed to the modelling 503b (e.g., between the sensing 503a updates). This may enable exploitation of the available computing time. As soon as available, the modelling 503b may rely on the result of the sensing 503a (e.g., all perception measurements as soon as they are provided).

According to various aspects, the modeling 503b does not necessarily have to form a new vicinity model in every iteration (illustratively, from scratch). For example, once a first version of the vicinity model exists, the modeling 503b may include updating the existing vicinity model (e.g., frequently) based on a result of the sensing 503a.

When (as result of 503), a collision 503c is predicted, the method 400 may include, in 505, one or more reactions to the predicted collision 503c.

Examples of the one or more reactions to the predicted collision 503c may include determining 401 when and/or where the predicted collision 503c occurs. Determining 401 where the predicted collision 503c occurs may include predicting the impact of the collision 503c (e.g., determining the impact location and/or the impact direction). In general, one or more spatial parameters, such as location and/or direction, of the collision 503c may be determined.

Examples of the one or more reactions to the predicted collision 503c may further include, in 505a, determining 401 an occupancy status of each of the one or more seats of the vehicle 100. In a less complex implementation, the occupancy status of a seat may only distinguish, whether the seat is occupied or not, that is, if the seat is occupied by an object or not. In a more complex implementation, the occupancy status of the seat may distinguish, whether the object occupying the seat is alive (e.g., a person or another living passenger, like a pet) or not. In a further more complex implementation, the occupancy status of the seat may distinguish, whether the seat is occupied by a child (e.g., a passenger being a child, a passenger holding a child, a pregnant passenger) or not. In a yet further more complex implementation, the occupancy status of a seat may distinguish, whether the passenger is pregnant or not (that is, if the seat is occupied by an unborn child or not).

In an additional or alternative more complex implementation, the occupancy status of a seat may distinguish, if the passenger (or another object) in the seat is secured (e.g., attached, fastened, buckled) to the seat or unsecured therefrom.

Examples of the one or more reactions to the predicted collision 503c may include, in 505b, instructing one or more actuators of the vehicle 100. Examples of the one or more actuators that are instructed in 505b may include one or more actuators of the seat 300. The one or more actuators of the seat 300 may be configured to reorient one or more seats 300 of the vehicle 100. The instructed one or more actuators may, for example, be configured to rotate and/or tilt the seat (e.g., a bench).

The tilting of the seat may include a rotational movement, and may, as used herein, denote a rotational movement that is limited (e.g., by the construction of the seat) to a maximum of about 90° (e.g., about 45°). Additionally or alternatively, the tilting of the seat may include a rotational movement about an axis slanted or perpendicular to axis 105. Rotating the seat may include a rotational movement, and may, as used herein, denote a rotational movement that is not limited (e.g., by the construction of the seat) to a maximum of about 90°. For example, rotating the seat may be possible about 360° or at least about 180°. Additionally or alternatively, rotating the seat may be about a rotation axis parallel to axis 105.

Examples of the one or more actuators that are instructed in 505b may include one or more actuators of an occupant-restraint system of the vehicle 100. In other words an actuation of (e.g., triggering) one or more components of an occupant-restraint system of the vehicle 100 may be instructed. Examples of the one or more components of an occupant-restraint system of the vehicle 100 may include one or more airbags, one or more seat belt actuators (e.g., one or more pretensioners and/or one or more webclamps), and the like.

Instructing one or more actuators of the vehicle 100, in 505b, may be based on a result of the determined 505a occupancy status. For example, an airbag may be disabled, when a pregnant woman is determined in the seat. For example, a rotation speed may be limited, when an unsecured object is determined in the seat.

In the exemplarily implantation, the method 400 may be stopped in 507 (e.g., in response to stopping the engine of the vehicle 100 and/or in response to determining all passengers leaving the vehicle 100).

According to various aspects, method 400 may provide a vehicular control system (e.g., a vehicular safety system) adjusting the seating position for the passengers in vehicle 100 in a situation of a predicted collision to minimize the risk of injury preemptively, which is independent of the pose and position of the passengers.

FIG. 6 shows a vehicle, namely vehicle 100, in accordance with various aspects 600 of the present disclosure. One or more seats 300 of the vehicle 100 may, for example, be configured to be rotatable (e.g., at least about a rotation axis 601 of the seat 300). The rotation axes 601 of the seats 300 may be separated from each other and/or be parallel to each other. Additionally or alternatively, the rotation axis 601 of each seat may be parallel to direction 105. For example, each rotatable seat 300 may be configured to allow a rotation freely about 360° degrees. Although other degrees of rotations are possible, safety can be maximized with this configuration in all directions in case of a potential collision.

According to at least one aspect, the vehicle 100 may include an occupant-restraint system (ORS) that has one or more airbags. For example, the ORS of the vehicle 100 may include only front airbags or may include more airbags, e.g., including one or more head airbags, one or more knee airbags, one or more side door airbags, one or more seat airbags, one or more seat belt airbags, one or more back seat airbags, and the like. The airbags of the ORS may be (similar to a seat belt) optimized for fixed, seated positions. According to various aspects, the configuration of the ORS may be adapted according to the circumstances (e.g., when the passenger is sleeping) when accounting for seat inclination or a seat rotation.

According to various aspects, a combination of hardware and/or software components may be provided, to allow the integration of the method 400 described herein. Usage of the method may, in some cases, be revealed by visual inspection. Therefore, dismantling the vehicle 100 may not be required to detect the usage of the method. For example, a determination may be made as to whether the seats and benches are rotated and/or tilted in response to certain events as an indicator to detect the usage of the method. A test-ride may allow verification of whether the seat reorientation would compensate for vehicle trajectory (e.g., in a comfort mode, as detailed later). A test-crash of the vehicle 100 (e.g., in a safety mode, as detailed later) could also potentially verify the implementation of the seat reorientation (e.g., rotation and/or tilting) to improve safety.

In the context of future mobility solutions, the freedom of passengers may be enhanced while they are being transported personally or in small groups, by a semi or fully self-driving (also referred to as autonomously driving) vehicle 100. For example, passengers might spend extended periods of time which they will want to enjoy with various activities, most probably involving either resting or group activities such as card games or discussions with other passengers. For this purpose, the method and safety system described herein may be tailored to both of these activities.

According to various aspects, the method and vehicular control system (e.g., vehicular safety system) may be configured for various seat orientations. In a first seat orientations, the seat may be a rotated, where the passenger is seated, facing an arbitrary direction, and optionally also reclined. This may be possible by using rotatable seats 300, which may optionally be configured to be reclined. Passengers sitting in a seat may enjoy the benefits of rotating seats 300, both allowing for forward-facing seats when in driving mode, when needing to face the direction of motion for comfort, rotate backwards to face the other passengers in the vehicle or sideways to enjoy the scenery. This provides a number of advantages both in terms of flexibility and comfort, such as entering/leaving the vehicle 100, and dynamically adjusting the seat 300 orientation with respect to acceleration, deceleration, and turns. For example, the seat reorientation may be configured, when a left turn is taken, to rotate the seat inwards with respect to the turn, to minimize discomfort due to lateral acceleration. Additionally or alternatively, this capability may be used for safety purposes, with a higher degree of maneuverability, allowing for one or more advantages to be realized from 360° surrounding the vehicle (e.g., independent from where the collision occurs as illustrated in the following).

Figure 7:
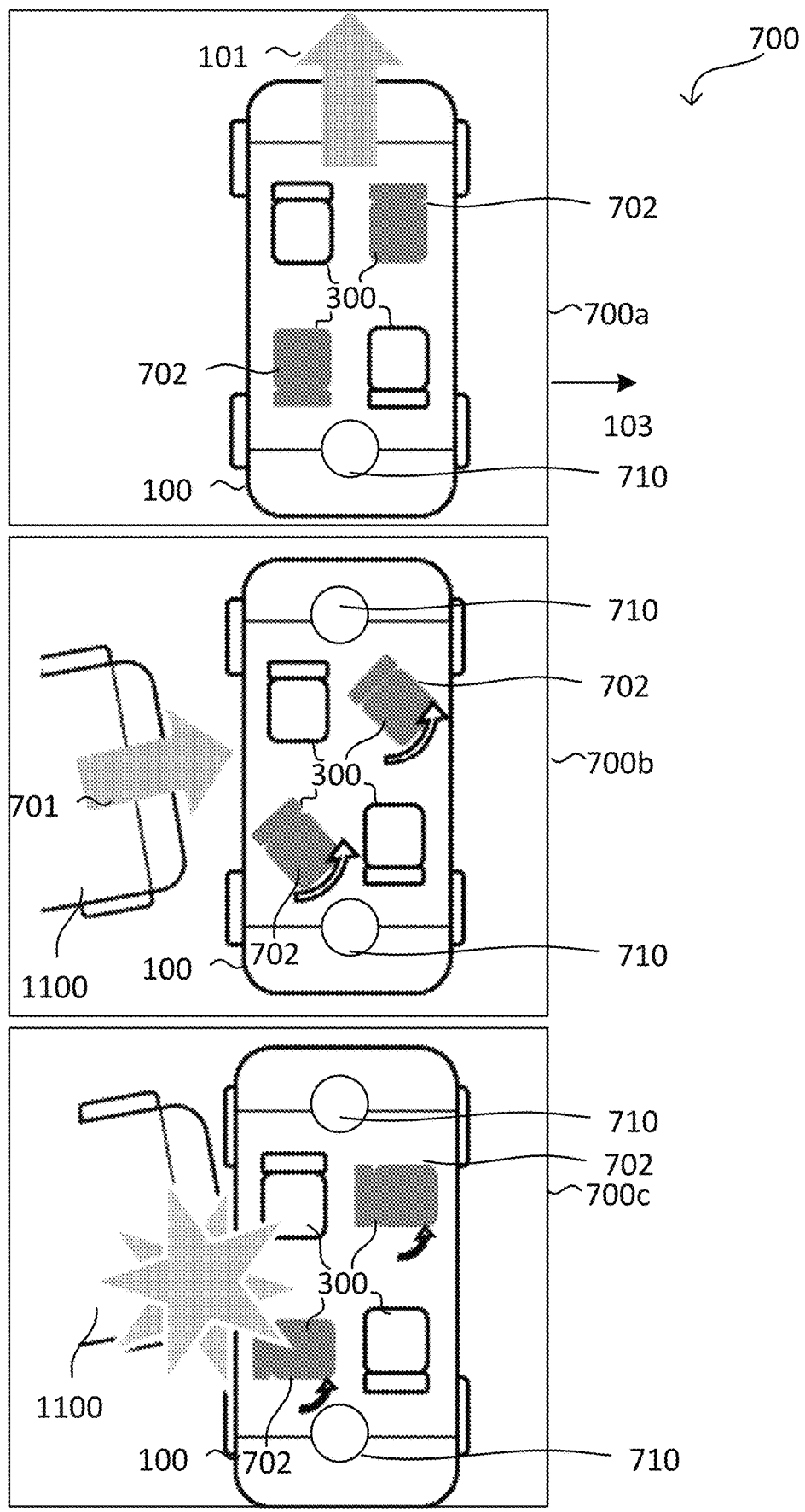

FIG. 7 shows an exemplary vehicle, namely the vehicle 100, in accordance with various aspects 700 of the present disclosure in different phases 700a, 700b, 700c of method 400. Illustratively, the example scenario shows a collision (e.g., viewed from direction 105). In phase 700a, the vehicle 100 is moving in direction 101. One or more seats 300 (e.g., bucket seats) of the vehicle 100 are determined to be occupied 702 (also referred to as occupied seats 702). In phase 700b, an imminent collision is detected (also referred to as predicting a collision). For example, another vehicle 1100 approaching 701 the vehicle 100 may be sensed. In response to predicting the collision, (e.g., only) the occupied seats 700 may be instructed to be reoriented to minimize risk. In phase 700c, the collision occurs as predicted with the orientation of the occupied seats 700 adjusted for maximum safety, e.g., facing away from the other vehicle 1100.

In at least one aspect, the seat reorientation may be configured to arrive at a seat orientation in a direction counter to the impact force. As result of the seat reorientation, the back side of the seat 300 may, in some aspects, face the collision. Therefore, the 400 method may include the determination of a target orientation (also referred to as set point of the seat orientation) of the seat based on where the collision is predicted to occur.

In phase 700b, the vehicular control system (e.g., vehicular safety system) may optionally be enhanced further, as described in the following. As previous noted, vehicle 100 may include or more airbags 710. Examples of the airbags 710 of the vehicle 100 may include: one or more airbags the front, one or more airbags in the back, one or more airbags in the sides, one or more airbags on the floor, and/or one or more airbags under the roof of the vehicle 100. When the collision is predicted, the target orientation may be determined based on the spatial distribution of airbags of the vehicle 100 (e.g., additionally or alternatively to being based on where the collision occurs). For example, the target orientation may be optimized according to positions of airbag(s) around the seat 300. Additionally or alternatively, the target orientation may be determined based on the efficiency (also referred to as airbag efficiency) of the airbag(s) with respect to the seat 300. The airbag efficiency may represent the efficiency of the airbag(s) to reduce injuries of the passengers. The airbag efficiency may, in some aspects, be dependent on one or more of the following parameters: the position of airbag(s) with respect to the seat 300, the angular orientation of the seat, where the collision is predicted to occur, and/or type of airbags in the vicinity of the seat 300.

An example is detailed in the following. In this example, the distribution of airbags may be such that an airbag efficiency of the airbags is at a maximum when the seat orientation is at a multiple of 15-degrees, e.g., at 0 degrees, 15 degrees, 30 degrees, 60 degrees, 75 degrees, etc. In response to predicting a crash, the set point of the seat reorientation may be determined based on where the crash is predicted to occur. Based thereon, the set point of the seat reorientation is determined to be at an orientation of 64 degrees with respect to direction 101. Subsequently, the airbag efficiency is considered. The set point of the seat reorientation may be updated to be closest to one of the multiple of 15-degrees, e.g., to 60 degrees. The set point of the seat reorientation at 60 degrees may cover the impact force well, but also provides the best benefits from the available spatial airbag distribution.

Various components of the vehicle 100 may communicate via a message exchange in accordance with a Controller Area Network (CAN) communication protocol. Additionally or alternatively, another network protocol may be used for the communication. Examples of the various components of the vehicle 100 may include component(s) predicting the collision, component of the ORS of the vehicle 100 (e.g., its actuators and/or controller) and/or component of the seat 300 (e.g., its actuators and/or orientation controller). For example, the ORS of the vehicle 100 (e.g., its actuators and/or controller) and/or the seat 300 may be separate subsystems.

Figure 8:
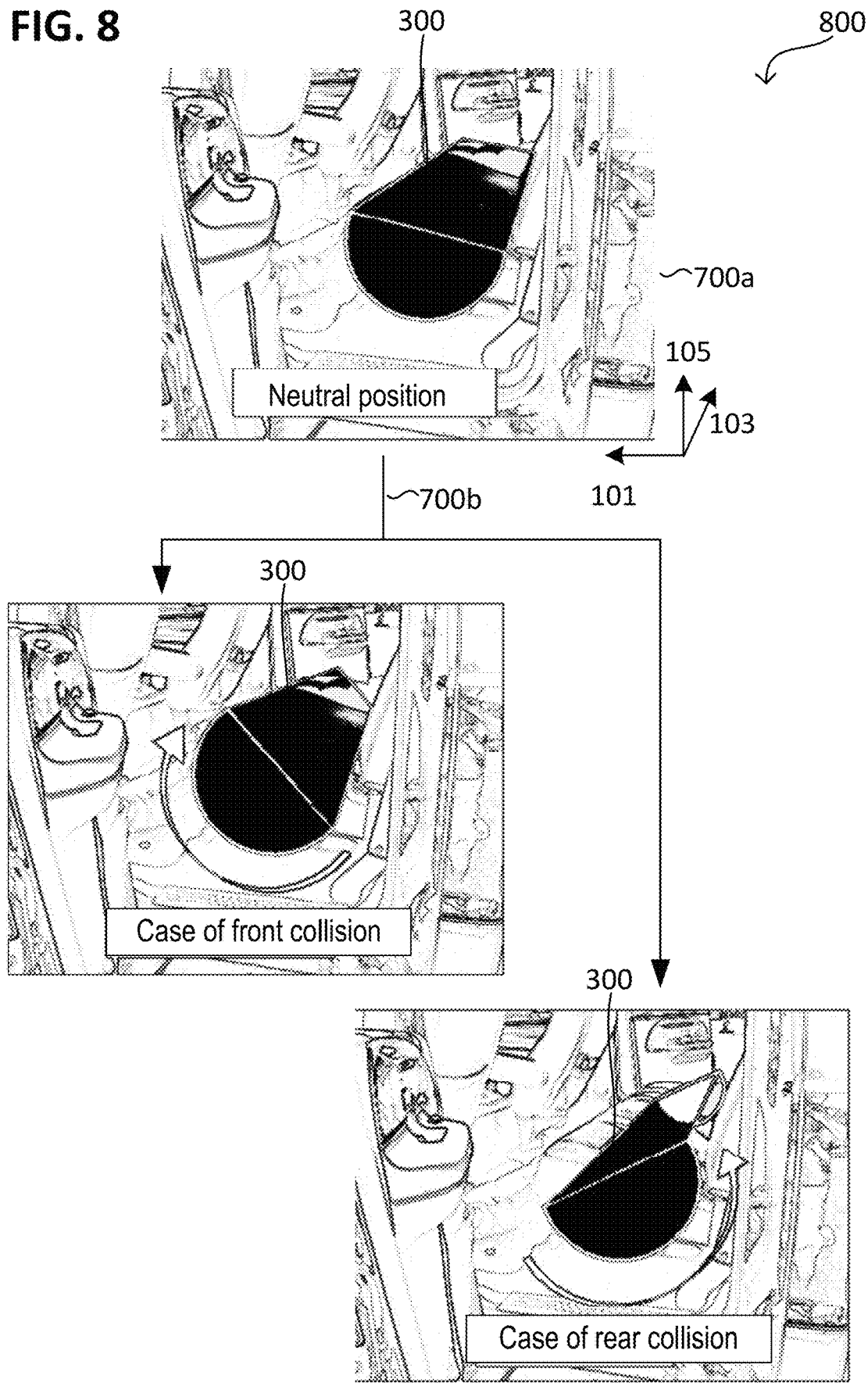

FIG. 8 shows an exemplary vehicle, namely vehicle 100, in accordance with various aspects 800 of the present disclosure in different phases 700a, 700b of method 400 (e.g., viewed along direction 103). Illustratively, the shown exemplarily scenario relates to a collision.

When the seat 300 of the vehicle 100 is a bucket seat, one or more rotation axes may be provided. For example, a first rotation axis of the bucket seat may be along axis 105, an optional second rotation axis of the bucket seat may be along axis 101, an optional third rotation axis of the bucket seat may be along axis 103. However, when the seat 300 of the vehicle 100 includes a bench, the rotation axis along axis 105 may be not available or blocked. One potential solution to this issue is detailed as follows.

According to various aspects, the method 400 may be applied to one or more benches of the vehicle 100 (also referred to as in-vehicle bench). A bench may allow a passenger to lay down in the vehicle 100. In phase 700a, the bench may be in a neutral position, e.g., having a top side being substantially flat (e.g., perpendicular to axis 105). In phase 700a, the vehicle 100 may be a moving vehicle 100, e.g., when the vehicle 100 is cruising.

Reorienting the bench based on the acceleration event may include tilting the bench, e.g., such that the bottom of the bench is rotated toward a force resulting from the acceleration event. Generally, the rotation axis (in this case the axis of the tilting movement) of the bench may have any orientation, e.g., being along the main extension (longest extension) of the bench, depending on the configuration of the vehicle 100.

For example, the first rotation axis of a bench may be along axis 103. In this case, the seat reorientation may include tilting the bench about the first rotation axis of the bench as depicted in FIG. 8. This case may apply, when the bench is mounted in a transversal extension with respect to the orientation of the vehicle 100 (e.g., along the first rotation axis). This configuration may allow to reorient the bench based on whether the collision is predicted to occur at the front (also referred to as front collision) or at the back (also referred to as back collision) of the vehicle 100. For example, in phase 700b, the bottom of the bench may rotated towards to where the collision is predicted to occur (e.g., to the back or front of the vehicle 100).

Additionally or alternatively, the second rotation axis of a bench may be along axis 101. In this case, the seat reorientation may include tilting the bench about the second rotation axis of the bench. This case may apply, when the bench is mounted in longitudinal extension with respect to the orientation of the vehicle 100. This configuration may allow reorientation of the bench based on whether the collision is predicted to occur at a left side or right side of the vehicle 100. For example, in phase 700b, the bottom of the bench may rotated towards to where the collision is predicted to occur (e.g., to the right or left side of the vehicle 100).

As described for the bucket seat above, the bench may be reoriented when the acceleration event is determined, e.g., having a positive acceleration or negative acceleration (e.g., by breaking). This allows maximization of comfort, as the passenger may perceive less lateral force and motion and/or is prevented from falling from the bench. Illustratively, the seat reorientation may be configured to tilt the bench to one of its sides.

A vehicle 100 equipped with semi and full self-driving capability may be configured to sense the vicinity of the vehicle 100, which may allow prediction of trajectories and collision courses. As such, when the vehicle 100 is predicting a frontal collision or rear collision, the vehicle 100 may tilt an occupied bench (e.g., on which a passenger is lying) in order to sink the passenger in the soft bench and thus reducing the risk of a passenger sliding across the vehicle's cabin. As result, the risk of injuries may be decreased.

As an additional option, tilting the bench may be performed along with using one or more seat belts, one or more harnesses, and/or one or more airbags as previously described for the rotating bucket seat, if required, to further improve safety.

Figure 9:
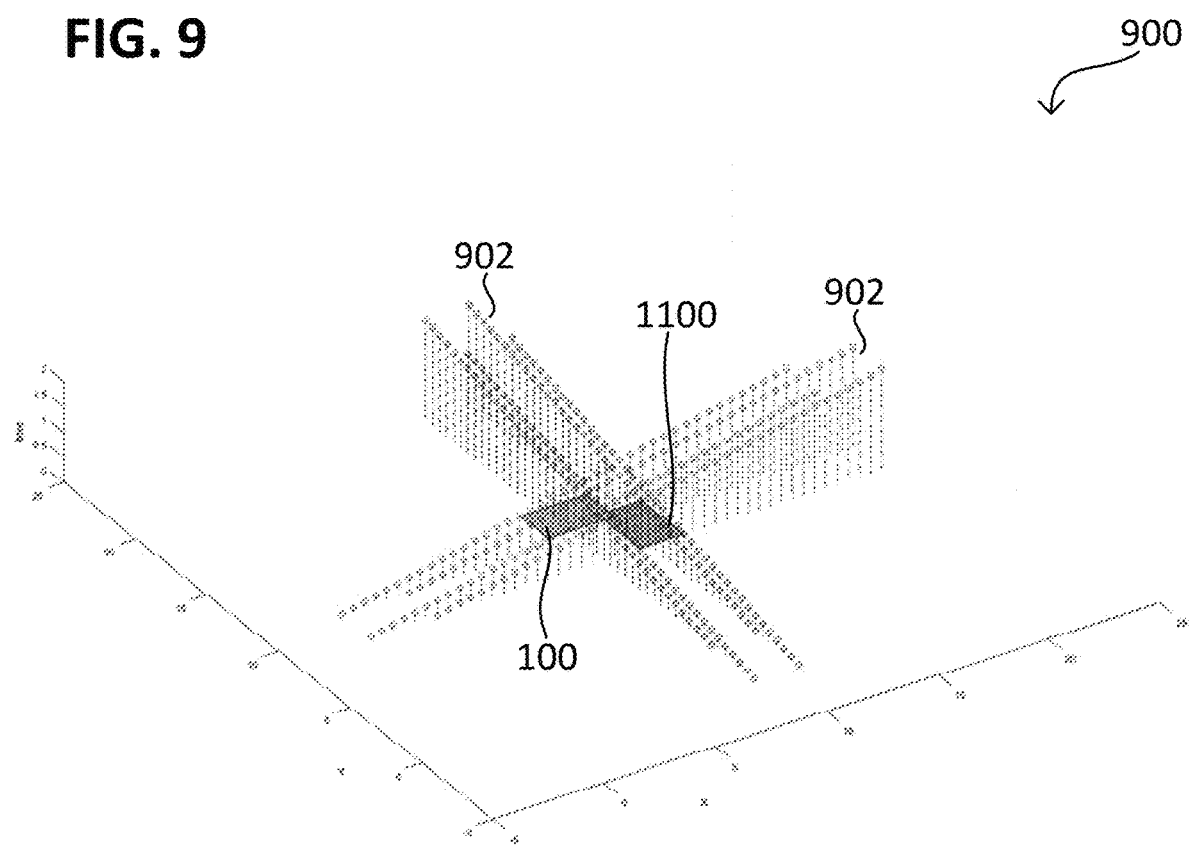
FIG. 9 shows predicted trajectories for two vehicles entering an intersection in accordance with various aspects of the present disclosure.

FIG. 9 shows an example of predicted (as described with respect to 1103c in FIG. 10 below) trajectories 902 for two vehicles 100, 1100 entering an intersection in accordance with various aspects 900. The prediction of the acceleration event may include predicting, in 1103*c*, trajectories 902 of two or more vehicles 100, 1100 over time, e.g., of the vehicle 100 and/or another vehicle 1100 in the vicinity of the vehicle. The prediction of the acceleration event may include further calculating intersections of the trajectories 902, e.g., based on one or more of the following: vehicle location, vehicle speed, vehicle orientation, and/or vehicle paths. The result predicting the acceleration event may, in some aspects, include a predicted collision (e.g., where the collision occurs) and/or a predicted time-to-collision (e.g., when the collision occurs).

Predicting the collision may be based on sensor data, e.g., provided by one or more sensors of the vehicle 100 (also referred to as on-board sensors) and/or one or more sensors distant (e.g., external) from the vehicle 100 (also referred to as off-vehicle sensors). Providing the sensor data may include (e.g., in phase 700*a*), sensing the vicinity of the vehicle 100. Examples of the one or more sensors may include: one or more cameras, one or more lidar sensor, one or more radar sensors, and/or one or more ultrasonic sensors.

In some aspects, providing the sensor data may include sampling the vicinity of the vehicle 100, in order to provide an up-to-date view of the environment (vicinity of the vehicle 100). The samples may be timestamped and synchronized in order to perform accurate and reliable sensor-fusion processing.

Predicting the collision may include modeling the vicinity of the vehicle 100 based on the sensor data. Modeling the vicinity of the vehicle 100 may provide a model of the vicinity of the vehicle 100 (also referred to as vicinity model), which is partially depicted in FIG. 9. Predicting a trajectory 902 of the vehicle 100 and/or one or more other vehicles 1100 in the vicinity of the vehicle 100 may be based on the vicinity model.

For example, the modelling may include combining the sensor data of the one or more vicinity sensors of the vehicle 100. Further, one or more (e.g., all) other vehicles 1100 in the vicinity of the vehicle 100 may be determined based on the vicinity model, e.g., one or more other stationary vehicles 1100 and/or one or more moving vehicles 1100. Additionally or alternatively, free space and/or potential obstacles may be determined based on the vicinity model. This will allow to determine, whether there are any obstacles in the trajectory of the vehicle 100.

The modelling may be based on a combination of algorithms, such as 3D-detectors for objects and free space algorithms for obstacle detection. An example of a 3D-detection algorithm is "Sparsely Embedded Convolutional Detection" (also referred to as "SEConD"). An example of an obstacle detection algorithm may be the "Stixel" algorithm. Also other trajectory prediction algorithms may be suitable for the modelling.

According to various aspects, the modelling may be based on a voxel map.

According to various aspects, a voxel map may be used to describe objects in the three-dimensional space based on voxels associated with objects. To determine one or more collisions based on a voxel map, ray-tracing, ray-casting, rasterization, etc., may be applied to the voxel data.

The vicinity model may, in some aspects, allow prediction 1103*c* of the trajectory 902 of the vehicle 100 and/or one or more vehicles 1100 of the surrounding traffic. For example, the trajectory 902 for the vehicle 100 may be predicted (e.g., based on the map data, based on sensor data and/or based on navigational data).

In at least one aspect, the map data may indicate the existence and interrelation of streets and intersections. The navigational data may represent the planned route for the vehicle 100 to arrive at a geolocation (e.g., a geolocation indicating the streets and intersections to be used). The actual trajectory of vehicle 100 along the planned route may be determined in more detail based on sensor data representing the vicinity of the vehicle (e.g., optical sensor data) and the like.

Based on the predicted trajectories of the vehicle 100 and one or more vehicles 1100 in the vicinity of the vehicle 100, a collision may be determined, e.g., including when and/or where the trajectory of the vehicle 100 overlaps the trajectory of one or more other vehicles 1100 in the vicinity of the vehicle 100 (also referred to as participants of the collision). Furthermore, one or more surrounding objects (e.g., pedestrians) or one or more obstacles (e.g., roadworks, trees, walls) in the vicinity of the vehicle 100 may be considered as participants of the collision.

In general, predicting the collision may include correlating the predicted trajectory of the vehicle 100 with the predicted trajectories of surrounding objects or obstacles over time.

A predicted trajectory of a moving object (e.g., a vehicle or a pedestrian) may, in some aspects, be a digital representation of the movement of the object. The predicted trajectory may include a sequence of spatial positions (also referred to as path) of the object that are successively acquired by the object. Each of the spatial positions may be allocated to when the spatial position is acquired by the object (e.g., a time of the acquiring), for example, such that a movement along the trajectory is considered. Optionally, one or more of the spatial positions may be allocated to a velocity of the object. Additionally or alternatively, the velocity may optionally be time-dependent, so that the acceleration of the object along the trajectory is taken into account. Additionally or alternatively to a sequence of spatial positions, the predicted trajectory may include the position of the object as function of time. Additionally or alternatively, the predicted trajectory may include probabilities allocated to each of the spatial positions, such that a deviation from the prediction may be considered. Also other representations of the movement of the object may be used as predicted trajectory.

When a collision is predicted, parameters of the collision (e.g., its impact, time and/or location) may be determined based on the vicinity model. The parameters of the collision (also referred to as collision parameters) may represent where and/or when the collision occurs at the vehicle 100. Examples of the collision parameters may include one or more spatial parameters (location and/or direction of the impact) and/or one or more temporal parameters (e.g., period until the impact and/or point of time of the impact).

The collision parameters may be determined based on the predicted trajectories of the participants of the collision, e.g., the vehicle 100 and/or one or more vehicles 1100 in the vicinity of the vehicle 100.

Other examples of the collision parameters may include the position, orientation, size, shape, and/or velocity of the participants of the collision. This enables improvement of the prediction.

For example, the one or more collision parameters may not only represent that there will be a collision, but also when the impact will occur, where the impact is coming from and/or where it will occur at the vehicle 100 (illustratively, where the vehicle 100 is hit). The temporal information representing when the impact occurs enables determination of a time-to-collision horizon as detailed later.

Additionally or alternatively, the time-to-collision horizon may be correlated with the rotation speed of the occupied seats. For example, the maximum period (e.g., one second) that a seat needs to be reoriented into each of possible target orientations may define the time horizon of the seat reorientation, that represents until which time the collisions need to be predicted. A processor may be configured such that the collision is determined before the time horizon of the seat reorientation.

Figure 10:
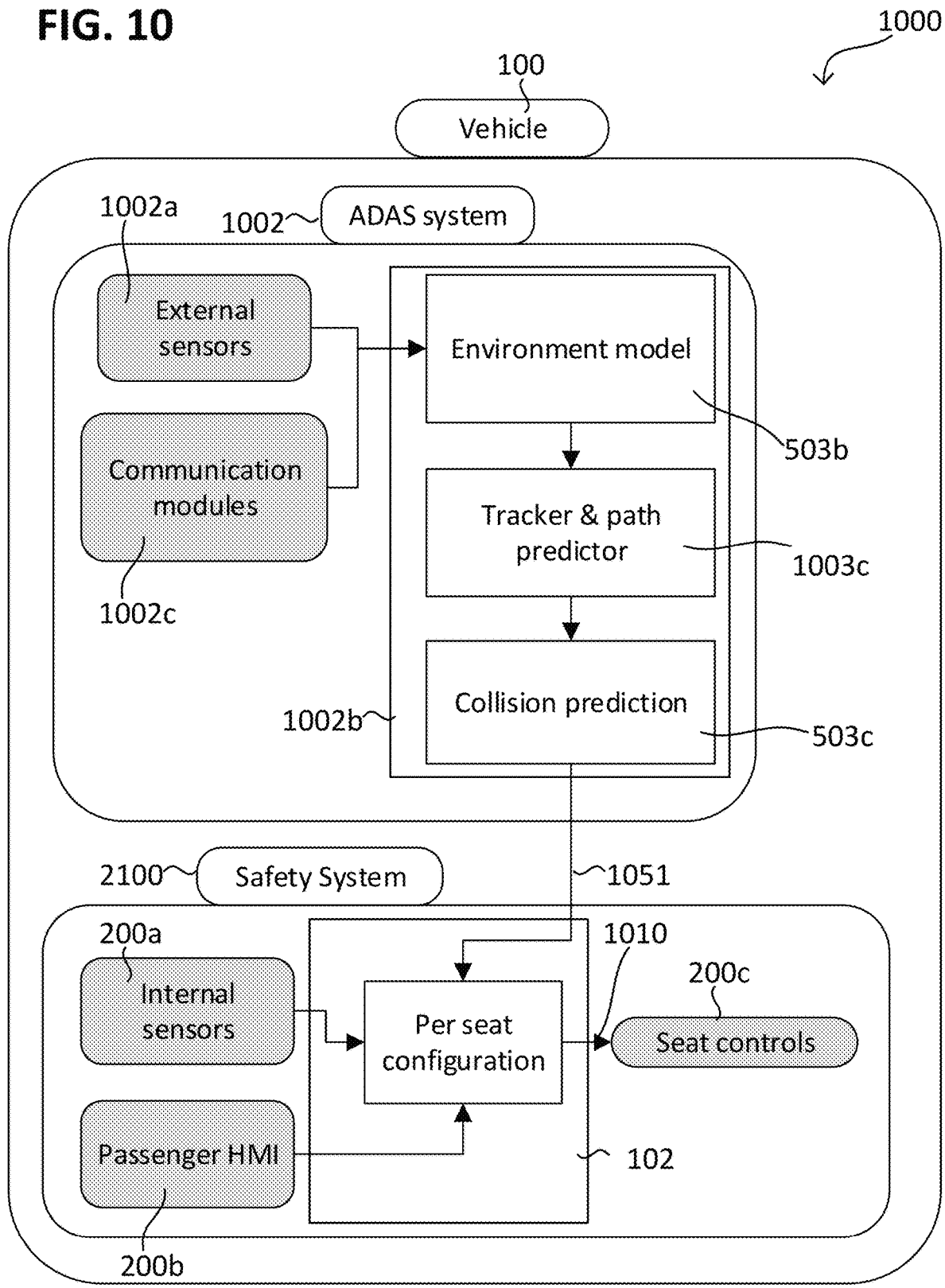
FIGS. 10 to 15 respectively show a method in accordance with various aspects of the present disclosure.

FIG. 10 shows the an exemplary method, namely method 400, in accordance with various aspects 1000 of the present disclosure (e.g., implemented by vehicle 100). The vehicle 100 may include one or more components configured to perform the method 400. In the following, reference is made to the collision as the acceleration event for demonstrative purposes, which is not intended to be limiting. If the acceleration event includes the vehicle 100 entering or leaving a curved section of the trajectory, the acceleration event may be determined based on at least one of the following: sensor data, map data, navigational data (also referred to as routing data) and the like.

Examples of the one or more components may include an Advanced Driver Assistance System 1002 (also referred to as ADAS system) configured to predict the collision (also referred to as predicted collision) based on sensor data. As result, the ADAS system may provide the one or more collision parameters 1051, e.g., as collision data. The one or more collision parameters 1051 may indicate when and/or where the collision occurs.

The ADAS system may include one or more on-board sensors 1002a configured to provide the sensor data. The one or more on-board sensors 1002a of the ADAS system (also referred to as external sensors or vicinity sensors) may be configured to sense the vicinity of the vehicle 100. Additionally or alternatively to the vicinity sensors 1002a, the ADAS system may include a communication module 1002c configured to receive sensor data.

Further, the ADAS system may include and/or one or more processors 1002b configured to process sensor data provided by the one or more on-board sensors and/or by the communication module 1002c. The communication module 1002c may be configured to receive sensor data provided by one or more off-vehicle sensors, for example, wireless. For example, communication module 1002c may be configured to receive the sensor data via a mobile radio communication standard. For example, communication module may include one or more of the wireless transceivers 208, 210, 212.

Examples of the one or more components may include a vehicular control system (e.g., a vehicular safety system 2100) configured to reorient one or more seats of the vehicle 100 based on the predicted acceleration event (e.g., the predicted collision). The safety system 2100 may, for example, include one or more on-board sensors 200a configured to provide sensor data. The one or more on-board sensors 200a (also referred to as internal sensors) of the safety system may be configured to sense one or more regions of the vehicle 100 itself (e.g., the passenger cabin of the vehicle 100). Examples of the internal sensors may include one or more seat-sensors (e.g., configured to detect a passenger presence and/or passenger weight), one or more seatbelt sensors, and/or one or more vehicle internal cameras (e.g., configured to detect the nature of each passenger, animal or object in each seat), etc. The one or more vehicle internal cameras may be configured to sense the pose of each passenger to be determined, which may be used to decide whether the seat rotation is obstructed for instance. For example, one or more of the seat may be configured to determine, whether the seatbelt is in use or not, via a built-in seatbelt sensor.

Optionally, the safety system 2100 may include one or more Human-Machine Interfaces (HMI) 200b configured to receive instructions by a passenger (also referred to passenger instructions as). For example, one or more parameters of the safety system 2100 may be customizable by the instructions received via HMI 200b (also referred to as customizable parameter(s)).

Further, the safety system 2100 may include one or more processors 102 configured to process the received data. The one or more processors 102 may be configured to instruct the reorientation of one or more seats (also referred to as output a reorientation instruction) of the vehicle 100 based on one or more of the following: the sensor data provided by the one or more on-board sensors 200a, the passenger instructions and/or the collision parameter 1051 (e.g., the collision data).

It may be understood that the ADAS system 1002 and the safety system 2100 do not have to be implemented as separate components. They may also share one or more processors to provide the processing functions (e.g., implemented by the same controller or the like).

Further, safety system 2100 may include one or more seat controllers 200c configured to receive the instruction 1010 to reorient (also referred to as reorientation instruction) one or more seats of the vehicle 100. For example, each of the seats may include one of the one or more seat controllers 200c. Also a common seat controller 200c may be used for controlling multiple seats. Each of the one or more seat controllers 200c may be configured to control one or more actuators of the seat based on the reorientation instruction 1010.

The reorientation instruction 1010 may include at least the target orientation of the seat to be reoriented. The target orientation may indicate the orientation of the seat that is to be achieved (also referred to as set point). For example, the target orientation may include one or more angles indicating the orientation of the seat in the coordinate system of the vehicle 100. In control theory, the set point refers to the desired value for an controlled parameter (e.g., the orientation of the seat in terms of the angle with respect to the coordinate system of the vehicle 100).

In case of multiple seats, the reorientation instruction may optionally include an identification of the seat to be reoriented. Optionally, the reorientation instruction 1010 may include one or more parameters of the reorientation as instructed by the reorientation instruction 1010. Examples of the one or more parameters of the reorientation may include: a speed of the reorientation and/or a time until the reorientation is to be finished. This enables a minimization of the risk of injury (e.g., when the reorientation speed is set to a minimum). Additionally or alternatively, the speed of the reorientation and/or a time until the reorientation is to be finished may be limited by the customizable parameter.

Examples of the one or more parameters of the reorientation (also referred to as reorientation parameters) may include a number of reversing the reorientation, e.g., if a vibration (e.g., shaking) is to be generated by the reorientation. This enables an increase in driver-attention, e.g., if the alert event is detected.

An example of the implantation of method 400 according to aspects 1000 is detailed in the following.

Method 400 may include determining the occupancy status of one or more (e.g., each) seats of the vehicle 100. Therefore, the one or more internal sensors 200a may include weight-sensors (e.g., disposed in each of the seats 300 or coupled to each of the seats 300). The weight-sensor may be configured to sense the presence of an object (e.g., passenger) in one or more of the seats and optionally the weight of the object. For example, the weight may be configured to be used as a proxy indicating the presence of the object. Optionally, the ORS may be reconfigured based on the weight. Reconfiguring the ORS may include suspending or re-suspending one or more components (e.g., airbags) of the ORS from actuation.

Suspending a component of the ORS from actuation may include obstructing the actuator of the component. Re-suspending a component of the occupant-restraint system from actuation may include removing the obstructing of the actuator. Illustratively, suspending (e.g., obstructing) an airbag from the actuation may achieve the result that the suspended airbag does not inflate, while a not-suspended airbag inflates when the ORS is triggered. Re-suspending removes the suspension from actuation, such that the re-suspended airbag inflates when the ORS is triggered. For example, an airbag which should not inflate in case an underage or underweight passenger is sensed, may be suspended.

In an example, the determination of how (e.g., whether or not, how fast, to which set point) a seat is instructed to be reoriented may be based on the weight indicating the presence of a passenger in the seat. Additionally or alternatively, the determination of whether an airbag is configured to inflate (also referred to as deploy), or not, may be based on the weight indicating the presence of a passenger in the seat.

The instructed seat reorientation may include a rotation and/or tilting of one or more seats (e.g., one or more benches). Optionally, one or more (e.g., only the not suspended) airbags may be deployed based on the instructed seat reorientation (e.g., the set point) and/or based on where the collision occurs.

According to various aspects, the direction of the impact may be considered in order to rotate and tilt one or more passenger seats, e.g., such that, the back of the passengers faces the collision. This has the potential to reduce the risk of a passenger flying through the passenger cabin of the vehicle 100 and/or reduce the risk of injuries due to the impact. For a 360° rotatable seat, this may be achieved in any direction of the impact. For a bench, the degree of freedom allows for a rotation in the axis perpendicular to the rotation axis of the seats. Depending on the orientation of the bench, the tilting of bench may be (e.g., only) in the perpendicular impact direction with respect to the bench orientation. For example, when the bench is mounted transversal in the vehicle 100, the tilting of the bench may be beneficial in case of a frontal collision or rear collision. For example, when the bench is mounted longitudinal in the vehicle 100, the tilting of the bench may be beneficial in case of a side impact.

The set point of the seat (e.g., bucket seat or bench) reorientation may be configured such that the acceleration of the vehicle 100 (at the acceleration event) presses the passenger into the seat or at least one into component of the seat, e.g., into the backrest 306 and/or into the seat base 310. For example, the seat (e.g., the backrest 306 and/or the seat base 310) may be brought between the passenger and the location of impact of the collision.

Additionally or alternatively, the set point of the seat reorientation may be determined individually (also referred to as per seat configuration) for each of the seats to be reoriented (e.g., for the occupied seats), e.g., based on the occupancy status of each of the seats.

The longest angle of rotation for each seat to be reoriented, which may be performed, is 180°, when the seat is configured to rotate in both directions. For example, at a given rotation speed, it may be determined for the predicted collision, whether the rotation time is sufficient for the seat to reach the set point. Deploying one or more airbags may be based on a result of determining the seat reorientation (e.g., considering whether the rotation time is sufficient for the seat to reach the set point). For example, the airbags deployed may cover the seat orientation at the time of the collision.

Instructing the seat reorientation may include determining the force (e.g., its direction) perceived by each of the passengers at the moment of the collision, e.g., by rigid body dynamics. The set point of the instructed seat reorientation, for each of the seats to be reoriented, may be based on the force perceived by each of the passengers occupying the seat.

The set point of the instructed seat reorientation may include or at least represent the angle, the seat is rotated to. For example, the orientation of the seat according to set point of the instructed seat reorientation may be configured to such that the seat faces away from the force perceived by that passenger, such that the force presses the passenger into the seat.

In accordance with aspects 1000, the vehicle 100 includes the ADAS system 1002 that is configured to perform the perception, modeling, tracking and/or prediction tasks. The result therefrom may be fed to the safety system 2100 configured to instruct the actuation of the seat reorientation and to control the seat reorientation.

As collision parameter, the impact location on the vehicle 100 may be provided. Optionally, individual vehicle speeds, accelerations and/or the impact orientation may be provided as collision parameter.

According to various aspects, the collision parameter may be communicated between components of the vehicle 100 (e.g., between the ADAS system and the safety system 200) via a communication network of the vehicle 100. The communication network may include, for example, an Ethernet and/or CAN bus. The communication network may be optionally configured to meet safety standards of the vehicle 100.

Figure 11:
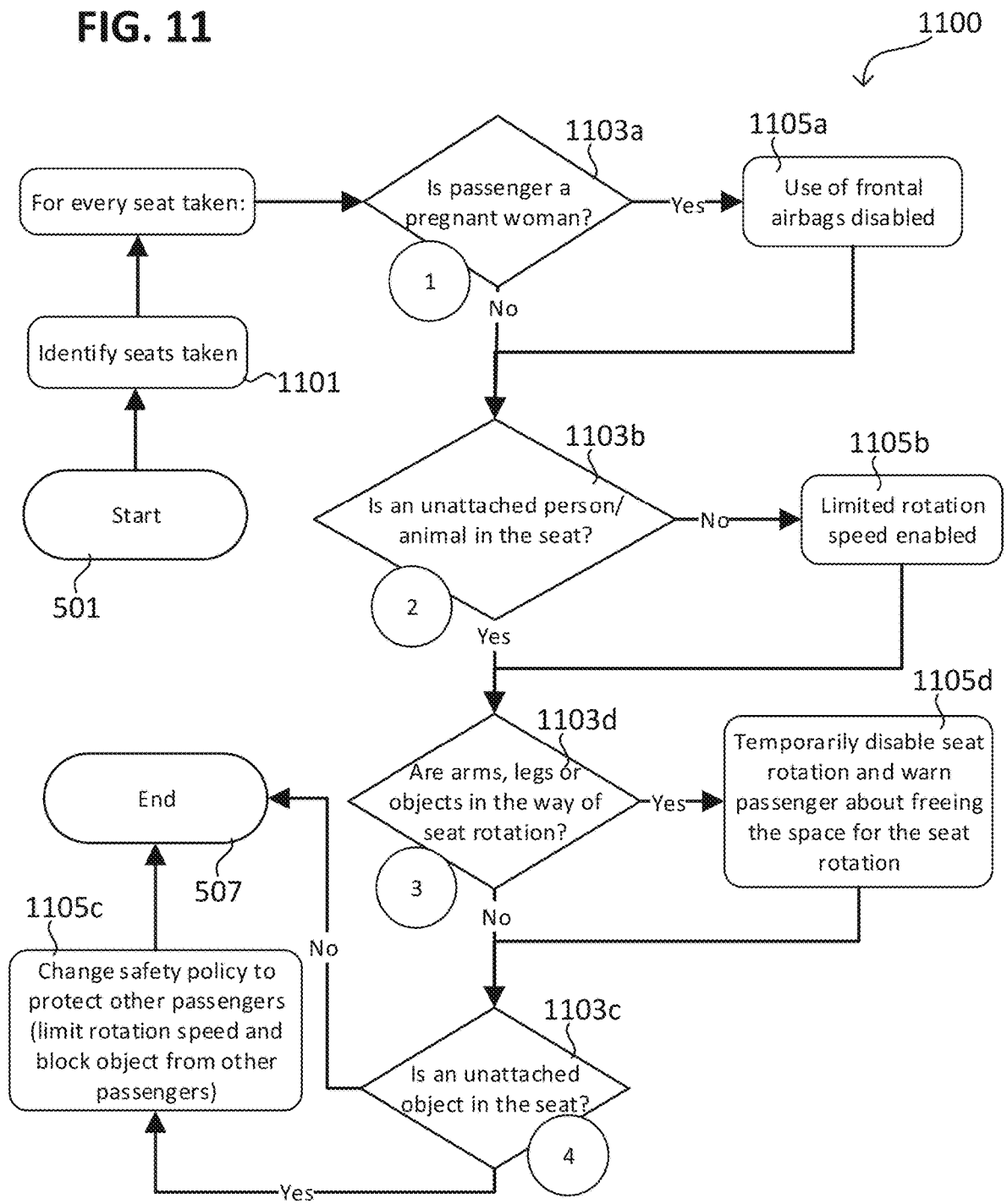

FIG. 11 shows an implementation of an exemplary method, namely method 400, in accordance with various aspects 1100 of the present disclosure. As detailed previously, the instructing of the seat reorientation may be based on the occupancy status of a seat to be reoriented. Additionally or alternatively, the instructing of a reconfiguration of the occupant-restraint system (ORS) may be based on the occupancy status of a seat. Thus, the method 400 may include determining the occupancy status of the seat to be reoriented, as described in the following. This enables consideration of additional circumstances that could impair the safety of the passenger(s).

In an exemplarily implantation according to aspects 1100, the method 400 may be initialized, in 501, e.g., in response to at least one of the following: starting the engine of the vehicle 100, determining a passenger in the vehicle 100, and/or determining a motion of the vehicle 100, and the like.

The method 400 may include, in 1101, determining whether one or more seats of the vehicle 100 are occupied. For example, each of the seats that are determined to be occupied may be classified as "to be reoriented" (also referred to as occupied seat).

The method 400 may include for each occupied seat, in 1103a, 1103b, 1103c, determining the occupancy status of the occupied seat. Examples of determining the occupancy status of the occupied seat may include, in 1103*a*, determining whether a passenger occupying the seat is pregnant or not, in 1103*b*, determining whether an living object occupying the seat is attached to the seat or not, and in 1103*c*, determining whether an non-living object occupying the seat is attached to the seat or not.

The method 400 may include for each occupied seat, in 1105*b*, 1105*c*, determining the seat reorientation (e.g., one or more parameters thereof) to be instructed to the occupied seat based on the occupancy status of the occupied seat. Examples of determining the seat reorientation may include, in 1105*b*, reduce a speed of the seat reorientation (e.g., the seat rotation) below the maximum or below the default value, when the (living or non-living) object occupying the seat is unattached to the seat. Examples of determining the seat reorientation may include, in 1105*c*, determining the set point of the seat reorientation, such that the back of the seat is facing other passengers, when the non-living object occupying the seat is unattached to the seat. The seat reorientation, in 1105*c*, may allow blocking the non-living object from being accelerated towards a passenger.

The method 400 may include for each occupied seat, in 1105*a*, instructing a reconfiguration of the ORS (e.g., one or more airbags thereof) based on the occupancy status of the occupied seat. Examples of the reconfiguration of the ORS may include, in 1105*a*, suspending one or more airbags, which (e.g., after the seat reorientation) face the passenger, from actuation, when the passenger occupying the seat is pregnant.

The method 400 may include for each occupied seat, in 1103*d*, determining whether the seat reorientation is obstructed (e.g., by an obstacle). Examples of determining whether the seat reorientation to be instructed is obstructed may include, in 1103*d*, determining whether one or more legs (or other objects) obstruct a reorientation of the seat (before instructing).

The method 400 may include for each occupied seat, in 1105*d*, determining the seat reorientation (e.g., one or more parameters thereof) to be instructed based on whether the seat reorientation to be instructed is obstructed. Examples of determining the seat reorientation based on whether the seat reorientation is obstructed, may include, in 1105*d*, suspending the seat reorientation from actuation and/or outputting an instruction to the passenger to remove the obstruction.

As an example of 1103*a*, 1105*a*, a passenger is a pregnant woman, and thus the airbags should be prevented from striking her womb. In this case, proper orientation of the seat and the woman may be derived and the appropriate risk metric may be determined to preclude airbag deployment in any area close to the womb. This leads to a risk factor which can be different, implying a different safe optimal seat orientation and a different optimal airbag deployment configuration.

Examples of 1103*b*, 1105*b*, include a passenger not wearing a seatbelt and an animal not being strapped on the seat, which could lead to the rotation of the seat being too drastic and propel the passenger or animal out of the seat, endangering the passenger or animal. In this case, the rotation speed may be limited to a lowest rotation speed, which is capable of placing the passenger or animal in a safe position, albeit in more time.

As an example of 1103*c*, 1105*c*, a passenger has legs, arms, and/or objects are in the way of the seat rotation, which may prevent proper rotation of the seat when preparing for an imminent collision. In this case, before a collision is predicted, a warning could be provided to the passenger, inviting the passenger to revert to a safer position (or remove objects) for the safety mechanism to run, or it could prevent the safety system from fully engaging, preventing potentially the rotation of the seat.

As example, determining whether the seat reorientation is obstructed by a passenger, e.g., whether one or more arms or legs are in the way of the seat rotation (that is they obstruct the seat rotation), may be based on one or more depth sensors (e.g., Intel RealSense) of the vehicle 100. For example, determining whether the seat reorientation is obstructed by a passenger may include determining the pose of the passenger based on the one or more depth sensors. For example, determining whether the seat reorientation is obstructed by a passenger may include modeling the pose of the passenger, e.g., the modeling may include virtual bones and joints of the passenger.

As example of 1103*d*, 1105*d*, an object may not be attached in the seat and could be sent out flying in the cabin in case of a collision, potentially harming another passenger. In this case, the method may prevent the object from colliding with any other passenger in the car. As such, the seat can adapt a position such that the back rest is blocking the object from aiming at one of the remaining passengers.

One or more of the above-mentioned circumstances 1103*a*, 1103*b*, and 1103*c*, 1103*d* may be determined by one or more internal sensors (and/or another perception mechanism) configured to sense the cabin of the vehicle 100. Additionally or alternatively, the safety system 2100 may be pre-configured according to the customizable parameter (e.g. by manual entry of the passengers) to prepare the safety system with the appropriate reorientation parameters and/or optimize the response to the circumstance(s).

In the following, a risk factor is detailed as an example of a metric that is configured to determine a seat reorientation that minimizes the risk if an injury of a passenger.

Figure 12:
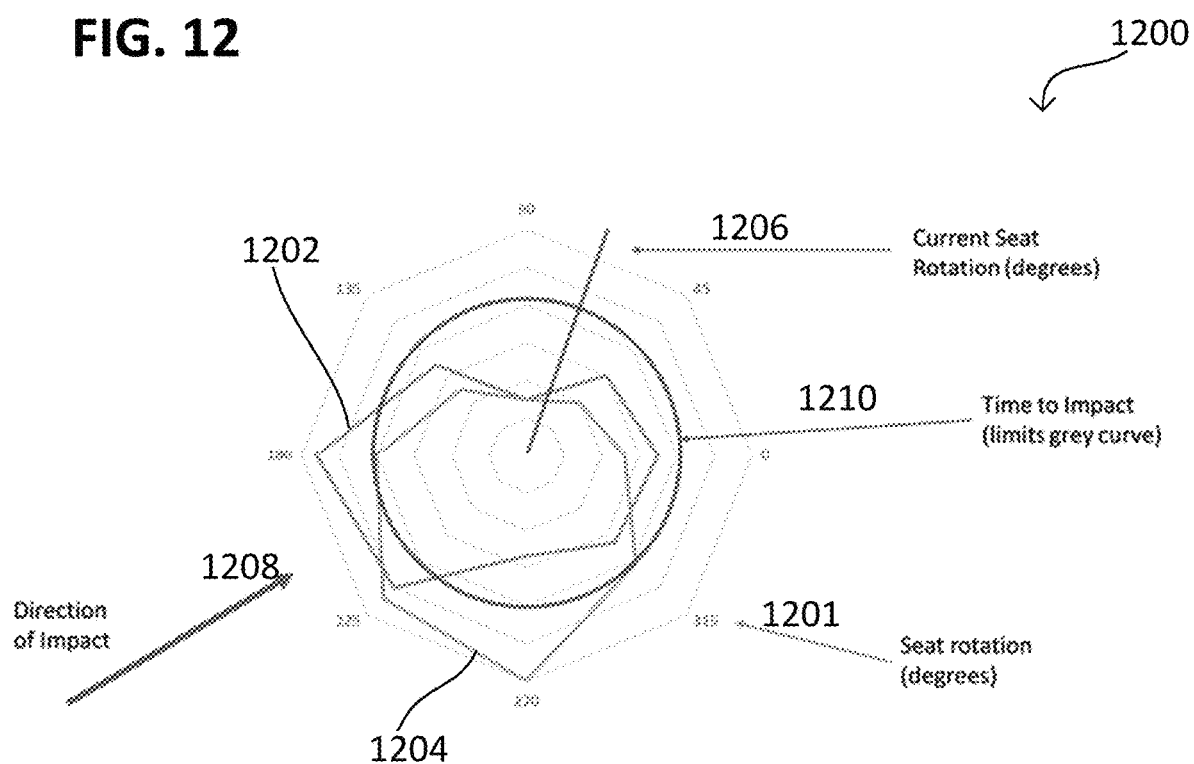

FIG. 12 shows an implementation of an exemplary method, namely method 400, in accordance with various aspects 1200 of the present disclosure, depicted in a qualitative diagram, in which the airbag efficiency 1202 and time to reach 1204 are depicted in polar coordinates having its origin at the rotation axis of a seat 300 (e.g., being parallel to axis 105).

Viewed along the rotation axis of a seat (e.g., from direction 105), the current rotational position of the seat is represented by the direction the front side of the seat is facing (also referred to as current status of the seat rotation or as current seat rotation 1206). Further, the spatial distribution of the collision is represented by the direction 1208 of the impact (also referred to as impact direction).

The radial coordinate of the polar coordinates represents the time coordinate of the parameters 1210, 1204. Circle 1210 represents, when the collision occurs, e.g., the time until the collision occurs (also referred to as time horizon of the collision or as time-to-collision horizon). Line 1204 represents the angular dependent time to reach 1204, that is, the time until the set point of the seat reorientation of the angle is reached (corresponds to the rotation time). As apparent from a comparison of 1210, 1204, some rotational seat positions are outside the time horizon 1210. This scenario may represent, when the collision is not predicted early enough or when the rotation speed is low, e.g., due to being reduced (which increases the time required to reach a target seat position).

In this scenario, an angular set point dependent risk factor R may be determined representing the situation. The risk factor R may be at a maximum value for each rotational position of the seat (that may be used as potential set points)

that cannot be reached before the collision occurs. For the remaining rotational positions of the seat (that may be used as potential set points), the risk factor R may be a function of the angular dependent airbag efficiency. In the following example, R is normalized to 1 representing the maximum injury risk, wherein R=0 represents the minimal injury risk.

An exemplarily relation for determining the risk factor R may be $$R(\eta_{Airbag}, t_{rotation}, t_{impact}) = \begin{cases} 1 - \eta_{Airbag}, & t_{rotation} \leq t_{impact} \\ 1, & t_{impact} > t_{rotation} \end{cases}$$

In this exemplarily relation, the risk factor R may be a function of the airbag efficiency $\eta_{Airbag}$, the time to reach (rotation time) $t_{rotation}$, and the time-to-collision $t_{impact}$. The risk factor R may be $1-\eta_{Airbag}$, when $t_{rotation} \leq t_{impact}$, representing the potential set points of the seat reorientation that can be reached before the collision. The risk factor R may be 1, when $t_{rotation} > t_{impact}$, representing the potential set points of the seat reorientation that cannot be reached before the collision.

As example, multiple values of the airbag efficiency $\eta_{Airbag}$ may be stored by the vehicle 100, e.g., by a memory of the vehicle 100. The respective value of the airbag efficiency $\eta_{Airbag}$ may be read out, e.g., based on where the collision occurs, based on the current configuration of the ORS, and/or based on the current seat orientation. For example, the airbag efficiency $\eta_{Airbag}$ may be stored as look-up-table (LUT) that was obtained by crash tests or by a simulation. Alternatively, the airbag efficiency $\eta_{Airbag}$ may be stored as a functional relationship.

As another example, the airbag efficiency $\eta_{Airbag}$ may be provided based on a simulation of the predicted collision (also referred to as collision simulation). The collision simulation may be based on the current configuration of the ORS, and/or based on the current seat orientation. For example, one or more processors of the vehicle 100 (e.g., in part, or completely) may perform the collision simulation. Additionally or alternatively, one or more processors externally from the vehicle 100 (e.g., in part or completely), may be perform the collision simulation, e.g., by cloud computing.

Figure 13:
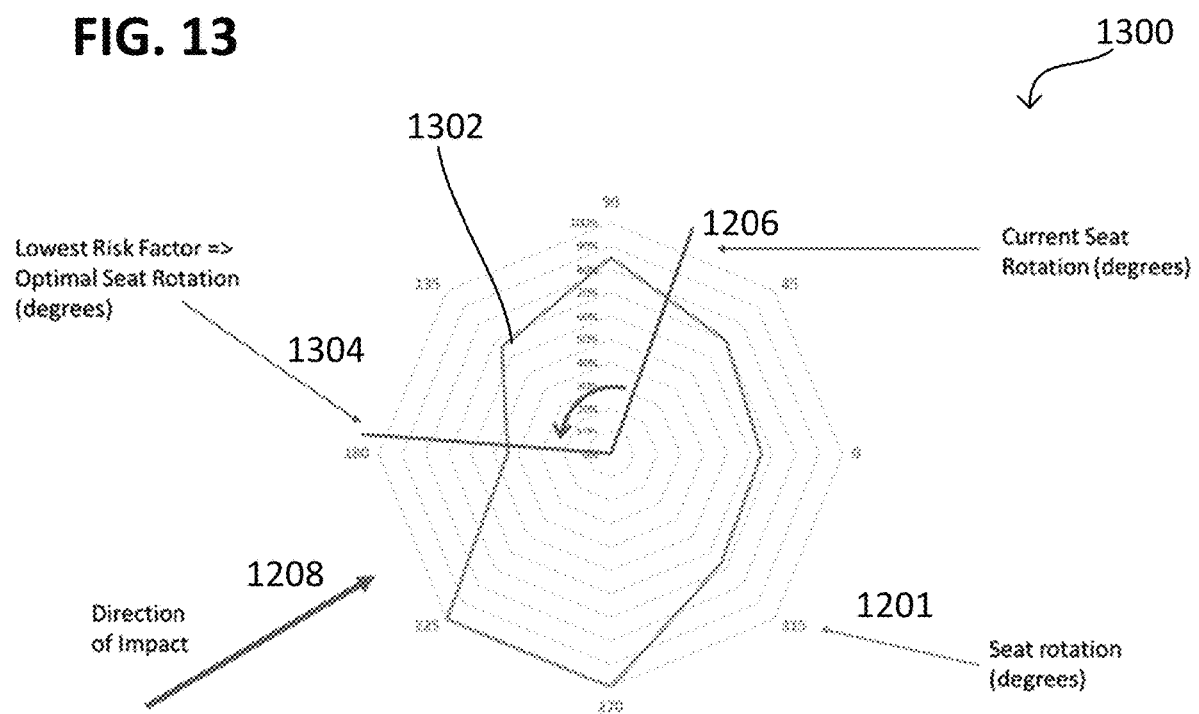

FIG. 13 shows an exemplarily implementation of the method 400 in accordance with various aspects 1300 of the present disclosure, depicted in a qualitative diagram, in which the risk factor 1302 is depicted in polar coordinates having its origin at the rotation axis of the seat 300. Here, the risk factor 1302 is normalized to 100%=1.

As apparent, the risk factor 1302 is at a minimum value for a set point 1304 of the seat reorientation of about 175 degree (also referred to as optimal set point). The seat reorientation (e.g., the set point of the seat reorientation) may be determined such that the risk factor 1302 is minimized. For example, the potential set point of the seat reorientation, at which risk factor 1302 is minimal, may be selected as the set point of the seat reorientation that is instructed.

For example, the risk factor may be based on determining the unavailable seat positions, which influence the optimal seat position for the minimum risk. With such a representation of the risk of injury for a given passenger, a measure may be provided to reason simultaneously across time, injury, and collision parameters.

Figure 14:
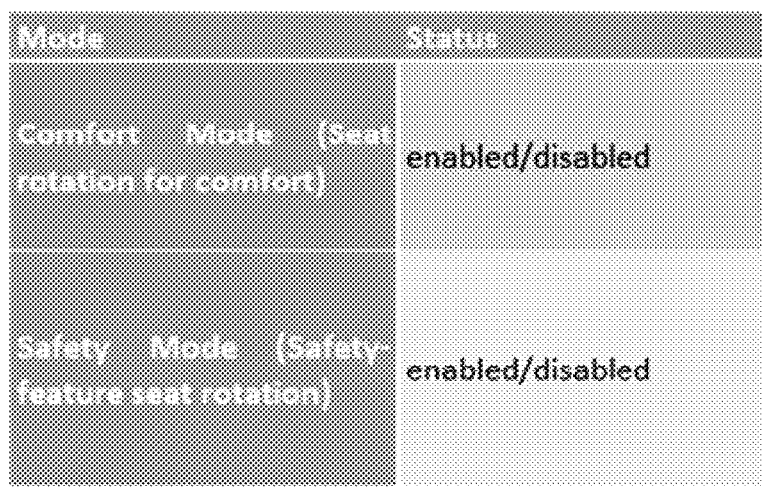

FIG. 14 shows an implementation of an exemplary method, namely method 400, in accordance with various aspects 1400 of the present disclosure.

While in many scenarios, the method 400 may be beneficial for limiting the injury risk and/or increasing the comfort, there might one or more scenarios, in which one or more components of the method 400 may be undesirable. Thus, the method 400 may include omitting the undesirable components according to a customizable parameter. The customizable parameter may be instructed by a passenger, e.g., individual for each of the seats 300, via the HMI 200b. For example, the front passenger airbag may be suspended from actuation (also referred to setting to a disabled status) via a button or a menu setting provided by the HMI 200b. In turn, the suspension may be removed (also referred to setting to an enabled status) via a button or a menu setting provided by the HMI 200b.

Unless a dangerous acceleration event is determined, the vehicle 100 may be in comfort mode. In comfort mode, the seat rotation may be instructed 405 based (e.g., only) on the predicted trajectory (also referred to as seat reorientation in comfort mode), e.g., independently from the vicinity of the vehicle 100 and/or until a collision is predicted. This may enable to reduce side forces on the passenger during regular travel via the vehicle 100, and thus, increase the comfort. The instruction of the seat rotation based on the predicted trajectory may be suspended (also referred to setting to a disabled status) via the HMI 200b, e.g., via a button or a menu setting provided by the HMI 200b. Also, the suspension may be removed (also referred to setting to an enabled status) via the HMI 200b, e.g., via a button or a menu setting provided by the HMI 200b.

For example, when a passenger dislikes the comfort mode, the passenger may set the comfort mode to the disabled status, without changing the status of the safety mode.

The one or more processors may be configured to (e.g., automatically) set the vehicle 100 to a safety mode, when a dangerous acceleration event is determined. In safety mode, the seat rotation may be instructed 405 based on a predicted collision, e.g., based on when and/or where the collision occurs. This may enable reduction of dangerous forces on the passenger arising from the impact of a collision of the vehicle 100, and thus, increase the safety. The instruction of the seat rotation based on the predicted collision (also referred to as seat reorientation in safety mode) may be suspended (also referred to setting to a disabled status) via the HMI 200b, e.g., via a button or a menu setting provided by the HMI 200b. Also, the suspension may be removed (also referred to setting to an enabled status) via the HMI 200b, e.g., via a button or a menu setting provided by the HMI 200b.

For example, the one or more processors may set the comfort mode to the disabled status, when a collision is predicted. As result, the comfort mode may be suspended, when a collision is predicted. This may enable the safety mode to be in complete control of the seat reorientation.

In a more complex implementation, multiple customizable parameters may be stored that represent, under which circumstances the status of the safety mode and/or the comfort mode may be changed. Switching between two of the customizable parameters may be automatically performed and/or may be based on determining a switching event. Examples of the switching event may include: a change of the seat position by the passenger, sensing a predetermined car key (that might be related to a certain person), sensing a predefined person entering the vehicle alone, sensing a user assigned to a customizable parameter (e.g., based on the weight sensor, microphone and/or camera), sensing a activation/deactivation of a user profile (e.g., based on the weight sensor); a smartphone Bluetooth-based mechanisms that maps the phone position to the person occupying a certain seat.

For example, sensing a user assigned to a customizable parameter may be based on one or more cameras and facial recognition to identify the user.

Figure 15:
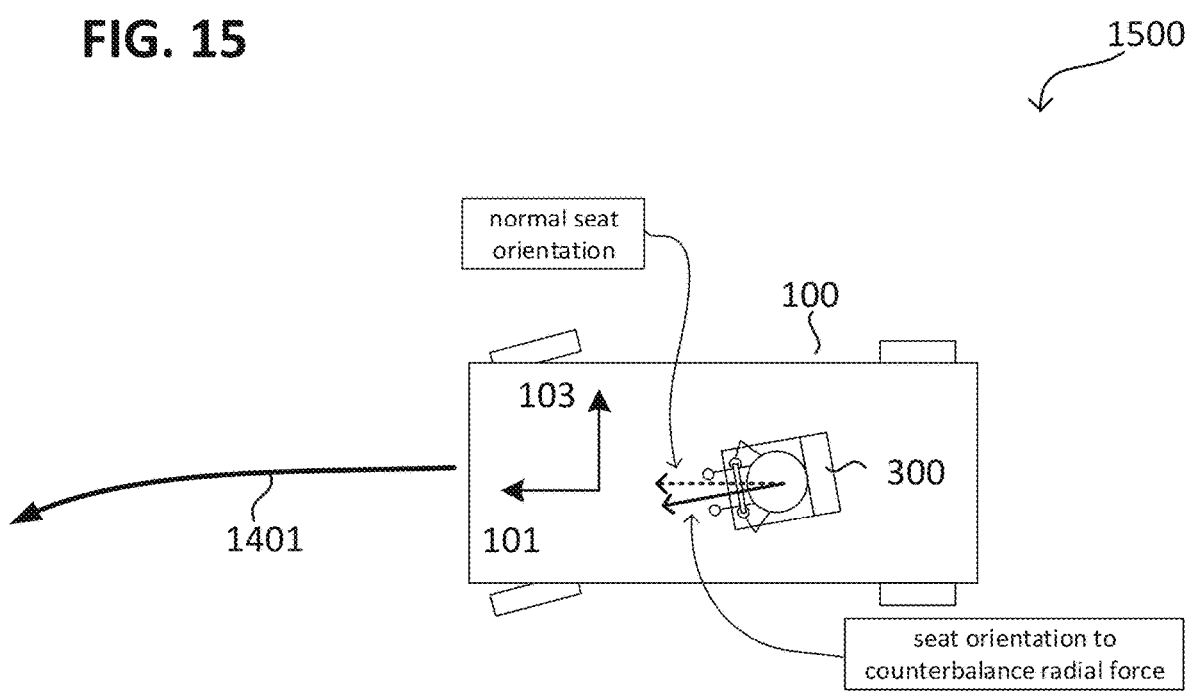

FIG. 15 shows an implementation of the comfort mode in accordance with various aspects 1500 of an exemplary method, namely method 400, of the present disclosure.

In in accordance with various aspects 1500 of method 400, a dynamic seating arrangement may be provided to increase passenger comfort, especially during a curved section of the trajectory, that may be planned by an autonomously moving vehicle. Increasing passenger comfort may be provided by lowering dynamic forces on an object being placed on a seat in the autonomous vehicle 100.

According to various aspects, it was recognized that lateral motions are one of the factors inducing kinetosis (also referred to as motion sickness) during travel. In the comfort mode, the vehicle 100 may increase comfort by reducing or neutralizing these lateral forces and thus motion(s) being exerted on the passenger(s) due to the trajectory of the vehicle. Optionally in the comfort mode, the whole vehicle 100 (e.g., the base) may be tilted for counteracting the lateral forces (also referred to as radial forces).

Reorienting each seat within the cabin of the vehicle 100, the actual forces on each of the passenger(s) and/or the constitution of the passenger(s) may be considered.

According to various aspects, an autonomously moving vehicle (of any kind) has no need for the passengers to control the vehicle actively or maintain a straight look and gaze through the front windshield at all times. For example, if the vehicle 100 is human passenger operated, movements of the driver seat would very likely impact the driver's ability to steer the vehicle correctly.

In consideration of the above, additionally or alternatively of tilting the whole vehicle, the seats may be reoriented (e.g., individually). The reorientation may include a rotational movement of the seat(s), e.g., multiple seats relative to each other and/or relative of the base of the vehicle 100. For example, a seat may be rotatable to create a versatile interior and may be dynamically adjusted according to the curvature of trajectory.

In the example of FIG. 15, a top view of the vehicle 100 is depicted. The vehicle 100 is planned to be moved along a curved section of the trajectory 1401. The arrow with a dotted line represents the default the set point of the seat 300 orientation for a straight section of the trajectory 1401. The solid arrow represents the set point of the seat reorientation (illustratively, adaptive seat orientation) to counterbalance the radial forces exerted on the passenger due to curved section of the trajectory 1401.

The set point of the seat reorientation (e.g., defining the angle of rotation) to compensate the lateral force component on the passenger may be determined mathematically. The trajectory 1401 of the autonomous vehicle 100 (e.g., planned by the autonomous steering mechanism of the vehicle 100) may be predicted. For example, the seat reorientation may be directly calculated based on the predicted trajectory and instructed. This enables a more reliable seat reorientation, as it is not necessarily need to be (but may additionally be), based the arbitrary steering input. Illustratively, the seat is held continuously in the optimal position without introducing a lag.

Optionally, the seat reorientation based on the predicted trajectory may also be based on one or more customizable parameters (e.g., to support for various personalized settings for the comfort seat rotation). Examples of the one or more customizable parameter of the comfort mode may include: a personal preference limiting the rotational speed in general; and/or variations in different submodes of the comfort mode.

A submode of the comfort mode may be selected from multiple submodes, e.g., manually or based on one or more internal sensors, e.g., based on one or more internal cameras. For example, a first submode of the comfort mode may be activated, when a person working on a laptop is determined. A person working on a laptop might be disturbed if the seat rotates at all or at a high speed or to a maximum angle. In another example, a second submode of the comfort mode may be activated, when a passenger using a smartphone is determined. A passenger using a smartphone may be disturbed if the seat rotates frequently.

In yet another example, a third submode of the comfort mode may be activated, when a passenger is determined to be using the smartphone on the ear for talking. For example, the third submode may lower the rotational speed of the seat reorientation.

In yet another example, a fourth submode of the comfort mode may be activated, when a sleeping or relaxing passenger is determined. For example, the fourth submode may lower the acceleration and decelerations of the seat reorientation compared to the default mode. When the relaxing passenger is the driver, a vibration may be generated by the seat reorientation.

Additionally or alternatively, multiple submodes of the comfort mode may represent different settings, e.g., like "low", "medium" and "high", which are independent of the scenario and modify one or more parameters of the seat reorientation to be instructed.

Furthermore, the rotatable seat may be used in a vehicle that supports (e.g., a maximum) SAE level of autonomy below level 4 (e.g. level 2 and/or level 3) to increase driver alertness. In combination with an in-cabin driver monitoring system, the seat adjustment may be actuated in a way to direct the gaze/attention of the driver to an alert event in outside of the driver's current field of view. Examples of an alert event may include: surrounding traffic (e.g. in a blind spot) or children appearing in between cars. To achieve this alertness, one or more slight seat reorientations may be instructed (e.g. tilting, turning, or shaking). The seat adjustments may additionally or alternatively be used to keep the driver awake if it is determined that the driver gets tired, for example by reorienting the seat into a less comfortable position for sleeping.

In the following, various examples of algorithms and mechanisms for implementing one or more aspects of the method are detailed.

Various aspects of the present disclosure may be related to instructing a seat reorientation based on when a predicted event occurs (e.g., in the comfort mode and/or the safety mode), at which (e.g. one or more components of) a velocity of a vehicle is changed.

Various aspects of the method (e.g., determining an event, when and/or where the event occurs, modeling, and/or tracking) may be performed by one or more processors of the vehicle 100. In other implementations, various aspects of the method (e.g., determining an event, when and/or where the event occurs, modeling, and/or tracking) may be performed by one or more processors externally from the vehicle 100. For example, information indicating when and/or where the acceleration event occurs may be also received by the vehicle 100, e.g., via a mobile radio communication standard. For example, information indicating the efficiency of the ORS, may be also received by the vehicle 100, e.g., via a mobile radio communication standard.

Various aspects of the method (e.g., determining an event, when and/or where the event occurs, modeling, tracking, and the like) may be based on data provided by one or more sensors of the vehicle 100 and/or by one or more off-vehicle sensors (sensors external from the vehicle 100). Examples of off-vehicle sensors may include road sensors and sensors of other vehicles. The data provided by off-vehicle sensors may be received by the vehicle 100 via a mobile radio communication standard.

Various aspects of the method (e.g., predicting a collision of the vehicle 100, predicting the trajectory of the vehicle 100, modelling the vicinity of the vehicle 100) may be based on at least one of the following: a model the vehicle 100 (e.g., a 3D-geometry), a (e.g., high definition) map of the vicinity of the vehicle 100 (e.g., including static information, such as roads and buildings), data provided by one or more sensors of the vehicle 100, and/or data provided by one or more off-vehicle sensors. For example, the map database 204 may be updated continuously (e.g., by a mobile radio communication standard) while moving the vehicle 100. For example, a high definition map may be streamed to the vehicle 100. A map with less resolution may be provided completely by the map database 204.

Predicting the trajectory of the vehicle 100 may be based on navigational data, optical sensor data, location data of the vehicle 100.

Modelling the vicinity of the vehicle 100 (e.g., a trajectory or another vehicle 1100) may be based on data provided by one or more sensors of the vehicle 100 and/or by one or more off-vehicle sensors, time based information, map data, information shared between multiple vehicles. Examples of the sensors may include a camera, a lidar, etc. Other examples of sensors may be implemented.

Examples for determining where the predicted event occurs may include determining a location of an impact of the predicted event at the vehicle; determining a direction of an impact of the predicted event; determining a location of the predicted event (e.g., a position at which the predicted event occurs); determining a location of the vehicle (or its boundaries), when the predicted event occurs. For example, the information about where the predicted event occurs may be described in the coordinate system of the vehicle. Examples for a function of where the predicted event occurs may include a function of the location of the predicted event.

Examples for determining whether a seat is occupied by a child may include determining if an adult occupying the seat is pregnant or not; and/or determining whether a seat is occupied by only an adult or not. Whether a person occupying a seat is a child or an adult may be determined based on the age of the person.

In the following, various further examples of algorithms and mechanisms for implementing one or more aspects of the method are detailed.

In the following, various aspects of the present disclosure will be illustrated:

Example 1 is a method, including: determining when a predicted event (e.g., a collision) occurs, at which (e.g. one or more components of) a velocity of a vehicle is changed; providing an instruction for (e.g., instructing) a change of a position (e.g., a reorientation) of one or more seats of the vehicle based on when the predicted event occurs.

Example 2 is the method of Example 1, wherein the change of the position (e.g., the reorientation), e.g., a set point of the change of the position (e.g., the reorientation), is further based on a parameter representing an efficiency of an occupant-restraint system of the vehicle, e.g., representing a spatial efficiency distribution of the occupant-restraint system.

Example 3 is the method of Example 2, wherein the parameter representing the efficiency of the occupant-restraint system is a function (e.g., of a location) of where the predicted event occurs and/or of a physical distribution of the occupant-restraint system.

Example 4 is the method of one of Examples 1 to 3, wherein the change of the position (e.g., the reorientation), e.g., a set point of the change of the position (e.g., the reorientation), is further based on a where of the predicted event occurs.

Example 5 is a method, including: determining where a predicted event occurs, at which (e.g. a component of) a velocity of a vehicle is changed; providing an instruction for (e.g., instructing) a rotational reorientation (rotation) of one or more seats of the vehicle based on where a predicted event occurs and based on a parameter representing an efficiency of an occupant-restraint system of the vehicle.

Example 6 is the method of Example 5, wherein the efficiency of the occupant-restraint system includes a spatial efficiency distribution of the occupant-restraint system.

Example 7 is the method of Example 5 or 6, wherein the parameter representing the efficiency of the occupant-restraint system is a function (e.g., of a location) of where the event occurs and/or of a physical distribution of the occupant-restraint system.

Example 8 is the method of one of Examples 5 to 7, wherein the change of the position (e.g., the reorientation), e.g., a set point of the change of the position (e.g., the reorientation), is further based on when the predicted event occurs.

Example 9 is the method of one of Examples 1 to 8, wherein the change of the position (e.g., the reorientation), e.g., a set point of the change of the position (e.g., the reorientation), is further based on a parameter representing an execution speed of the change of the position (e.g., the reorientation), e.g., a rotation speed of the change of the position (e.g., the reorientation).

Example 10 is the method of one of Examples 1 to 9, wherein the change of the position (e.g., the reorientation), e.g., a set point of the change of the position (e.g., the reorientation), is further based on an actual state (e.g. orientation and/or shape) of the one or more seats.

Example 11 is the method of one of Examples 1 to 10, wherein the change of the position (e.g., the reorientation) includes a change of position (e.g., rotation) of the one or more seats, e.g. about a vertical axis of the vehicle and/or relative to a base of the vehicle.

Example 12 is the method of one of Examples 1 to 11, wherein the change of the position (e.g., the reorientation), e.g., a set point of the change of the position (e.g., the reorientation), defines a spatial orientation of the one or more seats to be achieved, e.g. regarding a vertical axis of the vehicle.

Example 13 is the method of one of Examples 1 to 12, wherein a direction of the change of position (e.g., direction of rotation) of the change of the position (e.g., the reorientation) is based on a set point of reorientation and/or an actual state (e.g. orientation and/or shape) of the one or more seats.

Example 14 is the method of one of Examples 1 to 13, further including: providing an instruction for (e.g., instructing) a deformation of the one or more seats in response to the predicted event occurs, e.g., based on when and/or where the predicted event occurs.

Example 15 is the method of one of Examples 1 to 14, further including: providing an instruction for (e.g., instructing) an actuation of (e.g., triggering) one or more components of an occupant-restraint system of the vehicle in response to the predicted event and/or based on the instructed reorientation (e.g., its set point).

Example 16 is the method of one of Examples 1 to 15, wherein the change of the position (e.g., the reorientation) is further based on an occupancy status of the one or more seats (e.g., frequently determined) and/or is based on a user customizable parameter.

Example 17 is the method of example 16, wherein an execution (e.g. rotation) speed of the change of the position (e.g., the reorientation) is based on the occupancy status of the one or more seats and/or is based on the user customizable parameter.

Example 18 is the method of one of Examples 1 to 17, further including: providing an instruction for (e.g., instructing) a reconfiguration of an occupant-restraint system of the vehicle based on the change of the position (e.g., the reorientation) (e.g., its set point) and/or an occupancy status of the one or more seats.

Example 19 is the method of Example 18, wherein the reconfiguration of the occupant-restraint system includes to suspend or re-suspend one or more components (e.g., airbags) of the occupant-restraint system from actuation.

Example 20 is the method of one of Examples 16 to 19, wherein the occupancy status represents one of the following: whether a seat is occupied by a child (e.g., unborn) or not (e.g., only an adult); whether an object occupying the seat is secured (e.g., attached, fastened, buckled) to the seat or unsecured therefrom; and whether a seat is occupied by a living object or a non-living object.

Example 21 is the method of one of Examples 1 to 20, wherein the change of the position (e.g., the reorientation), e.g., a set point of the change of the position (e.g., the reorientation), is further based on a determined obstruction of the change of the position (e.g., the reorientation).

Example 22 is the method of one of Examples 1 to 21, wherein determining when the predicted event occurs includes determining a time interval until the predicted event or the point of time of the predicted event.

Example 23 is the method of one of Examples 1 to 22, wherein the predicted event includes a predicted collision of the vehicle or with the vehicle and/or the vehicle entering a curved section of a trajectory of the vehicle.

Example 24 is the method of one of Examples 1 to 23, wherein the predicted event is determined based on a trajectory of one or more vehicles in a vicinity of the vehicle.

Example 25 is the method of Example 24, wherein the trajectory is determined based on one or more sensors of the vehicle.

Example 26 is the method of one of Examples 1 to 25, wherein the vehicle implements a mechanism configured to reorient the one or more seats based on a trajectory of the vehicle, wherein the mechanism is suspended in response to providing the instruction for (e.g., instructing) the change of the position (e.g., the reorientation) and/or in response to determining when the predicted event occurs.

Example 27 is the method of one of Examples 1 to 26, wherein the change of the position (e.g., the reorientation) is multidimensional (e.g., about and/or along at least two axes).

Example 28 is a method, including: determining a predicted trajectory of a vehicle (e.g., being in an autonomous driving mode); providing an instruction for (e.g., instructing) an rotational reorientation of one or more seats of the vehicle based on the predicted trajectory (e.g., relative to a base of the vehicle), e.g. wherein the change of the position (e.g., the reorientation) includes one or more rotational movements of the one or more seats relative to a base of the vehicle. Optionally the change of the position (e.g., the reorientation) includes a rotation of the seat about a vertical axis of the vehicle and/or relative to a base of the vehicle. Optionally, a rotational set point of the change of the position (e.g., the reorientation) is based on the predicted trajectory.

Example 29 is the method of Example 28, wherein the change of the position (e.g., the reorientation) is based on an acceleration force resulting from a curvature of the trajectory, e.g., on a direction of the acceleration force.

Example 30 is the method of Example 28 or 29, wherein the predicted trajectory is determined based on sensor data of the vehicle.

Example 31 is a method, including: determining an event in a vicinity of a vehicle and/or indicating a lack of attention of a driver of the vehicle (e.g., regarding the vicinity); providing an instruction for (e.g., instructing) one or more reorientations of a seat of the vehicle in response to the event, wherein the seat is occupied by the driver of the vehicle.

Example 32 is the method of Example 31, wherein the one or more reorientations include multiple sequential reorientations causing a vibration of the seat; or wherein the one or more reorientations decrease a degree of comfort provided by the seat (e.g., change a reclining position of the seat).

Example 33 is the method of one of Examples 1 to 32, wherein the change of the position (e.g., the reorientation) includes one or more rotational movements, e.g. about a vertical axis of the vehicle and/or relative to a base of the vehicle.

Example 34 is the method of Example 33, wherein the rotational movement, includes a tilting movement, e.g. about a horizontal axis and/or relative to a base of the vehicle.

Example 35 is the method of one of Examples 1 to 34, wherein the change of the position (e.g., the reorientation) includes a deformation of the one or more seats, e.g., a movement of a backrest (also referred to as reclination) and/or movement of an armrest of the one or more seats.

Example 36 is the method of one of Examples 1 to 35, wherein the instruction for (e.g., instructing) the change of the position (e.g., the reorientation) indicates one or more actuators (e.g., of the vehicle, e.g., of the seat) configured to drive the change of the position (e.g., the reorientation).

Example 37 is the method of one of Examples 1 to 36, wherein the change of the position (e.g., the reorientation), e.g., a set point of the change of the position (e.g., the reorientation), is instructed individually for each seat of the one or more seats.

Example 38 is the method of one of Examples 1 to 37, wherein providing an instruction for (e.g., instructing) the change of the position (e.g., the reorientation) includes generating a message according to a communication protocol, the message including one or more parameters of the change of the position (e.g., the reorientation), e.g., a set point of the change of the position (e.g., the reorientation), a speed of the change of the position (e.g., the reorientation), and/or a direction of the change of the position (e.g., the reorientation).

Example 39 is the method of one of Examples 1 to 38, wherein the determining is based on sensor data of the vehicle.

Example 40 is the method of Example 39, wherein the sensor data represents the vicinity of the vehicle, e.g., one or more (stationary or moving) objects in the vicinity of the vehicle, e.g., traffic surrounding the vehicle.

Example 41 is the method of one of Examples 1 to 40, wherein the determining is based on data received by the vehicle, e.g., via a mobile radio communication standard.

Example 42 is a method, including: determining a spatial parameter of a predicted event, at which (e.g. a component of) a velocity of a vehicle is changed; providing an instruction for (e.g., instructing) a change of position (e.g., a rotation) of one or more seats of the vehicle, wherein a rotational set point of the change of the position (e.g., the reorientation) is based on the spatial parameter and based on a parameter representing an efficiency of an occupant-restraint system of the vehicle.

Example 43 is a method, including: determining a temporal parameter of a predicted event, at which (e.g. a component of) a velocity of a vehicle is changed; providing an instruction for (e.g., instructing) an adjustment of one or more seats of the vehicle, wherein a set point of the adjustment is (e.g. determined) based on the temporal parameter.

Example 44 is one or more non-transitory computer-readable media storing instructions thereon that, when executed by at least one processor, direct the at least one processor to perform the method of one of examples 1 to 43.

Example 45 is a controller including one or more processors configured to perform the method of one of examples 1 to 43.

Example 46 is a vehicle including one or more seats and the controller of example 45, wherein, for example, the one or more seats are mounted on a base of the vehicle and/or in a cabin of the vehicle, wherein, for example, the vehicle is an autonomous vehicle.

Example 47 is a controller (e.g., for a vehicle), including one or more processors configured to: determine when a predicted event occurs, at which (e.g. one or more components of) a velocity of the vehicle is changed; provide an instruction for (e.g., instruct) a change of a position (e.g., a reorientation) of one or more seats of the vehicle based on when the predicted event occurs.

Example 48 is the controller of Example 47, wherein the change of the position (e.g., the reorientation), e.g., a set point of the change of the position (e.g., the reorientation), is further based on a parameter representing an efficiency of an occupant-restraint system of the vehicle, e.g., representing a spatial efficiency distribution of the occupant-restraint system.

Example 49 is the controller of Example 48, wherein the parameter representing the efficiency of the occupant-restraint system is a function (e.g., of a location) of where the predicted event occurs and/or of a physical distribution of the occupant-restraint system.

Example 50 is the controller of one of Examples 1 to 49, wherein the change of the position (e.g., the reorientation), e.g., a set point of the change of the position (e.g., the reorientation), is further based on a where of the predicted event occurs.

Example 51 is a controller, including one or more processors configured to: determine where a predicted event occurs, at which (e.g. a component of) a velocity of a vehicle is changed; provide an instruction for (e.g., instruct) a rotational reorientation (rotation) of one or more seats of the vehicle based on where a predicted event occurs and based on a parameter representing an efficiency of an occupant-restraint system of the vehicle.

Example 52 is the controller of Example 51, wherein the efficiency of the occupant-restraint system includes a spatial efficiency distribution of the occupant-restraint system.

Example 53 is the controller of Example 51 or 52, wherein the parameter representing the efficiency of the occupant-restraint system is a function (e.g., of a location) of where the event occurs and/or of a physical distribution of the occupant-restraint system.

Example 54 is the controller of one of Examples 51 to 53, wherein the change of the position (e.g., the reorientation), e.g., a set point of the change of the position (e.g., the reorientation), is further based on when the predicted event occurs.

Example 55 is the controller of one of Examples 47 to 54, wherein the change of the position (e.g., the reorientation), e.g., a set point of the change of the position (e.g., the reorientation), is further based on a parameter representing an execution speed of the change of the position (e.g., the reorientation), e.g., a rotation speed of the change of the position (e.g., the reorientation).

Example 56 is the controller of one of Examples 47 to 55, wherein the change of the position (e.g., the reorientation), e.g., a set point of the change of the position (e.g., the reorientation), is further based on an actual state (e.g. orientation and/or shape) of the one or more seats.

Example 57 is the controller of one of Examples 47 to 56, wherein the change of the position (e.g., the reorientation) includes a change of position (e.g., a rotation) of the one or more seats, e.g. about a vertical axis of the vehicle and/or relative to a base of the vehicle.

Example 58 is the controller of one of Examples 47 to 57, wherein the change of the position (e.g., the reorientation), e.g., a set point of the change of the position (e.g., the reorientation), defines a spatial orientation of the one or more seats to be achieved, e.g. regarding a vertical axis of the vehicle.

Example 59 is the controller of one of Examples 47 to 58, wherein a direction of a change of position (e.g., direction of rotation) of the change of the position (e.g., the reorientation) is based on a set point of reorientation and/or an actual state (e.g. orientation and/or shape) of the one or more seats.

Example 60 is the controller of one of Examples 47 to 59, the one or more processors further configured to: provide an instruction for (e.g., instruct) a deformation of the one or more seats in response to the predicted event occurs, e.g., based on when and/or where the predicted event occurs.

Example 61 is the controller of one of Examples 47 to 60, the one or more processors further configured to: provide an instruction for (e.g., instruct) an actuation of (e.g., trigger) one or more components of an occupant-restraint system of the vehicle in response to the predicted event and/or based on the instructed reorientation.

Example 62 is the controller of one of Examples 47 to 61, wherein the change of the position (e.g., the reorientation) is further based on an occupancy status of the one or more seats (e.g., frequently determined) and/or is based on a user customizable parameter.

Example 63 is the controller of Example 62, wherein an execution (e.g. rotation) speed of the change of the position (e.g., the reorientation) is based on the occupancy status of the one or more seats and/or is based on the user customizable parameter.

Example 64 is the controller of one of Examples 47 to 63, the one or more processors further configured to: provide an instruction for (e.g., instruct) a reconfiguration of an occupant-restraint system of the vehicle based on the change of the position (e.g., the reorientation) (e.g., its set point) and/or an occupancy status of the one or more seats.

Example 65 is the controller of Example 64, wherein the reconfiguration of the occupant-restraint system includes to suspend or re-suspend one or more components (e.g., airbags) of the occupant-restraint system from actuation.

Example 66 is the controller of one of Examples 62 to 65, wherein the occupancy status represents one of the following: whether a seat is occupied by a child (e.g., unborn) or not (e.g., only an adult); whether an object occupying the seat is secured (e.g., attached, fastened, buckled) to the seat or unsecured therefrom; and whether a seat is occupied by a living object or a non-living object.

Example 67 is the controller of one of Examples 47 to 66, wherein the change of the position (e.g., the reorientation), e.g., a set point of the change of the position (e.g., the reorientation), is further based on a determined obstruction of the change of the position (e.g., the reorientation).

Example 68 is the controller of one of examples 47 to 67, wherein the determine when the predicted event occurs includes determine a time interval until the predicted event or the point of time of the predicted event.

Example 69 is the controller of one of Examples 47 to 68, wherein the predicted event includes a predicted collision of the vehicle or with the vehicle and/or the vehicle entering a curved section of a trajectory of the vehicle.

Example 70 is the controller of one of Examples 47 to 69, wherein the predicted event is determined based on a trajectory of one or more vehicles in a vicinity of the vehicle.

Example 71 is the controller of Example 70, wherein the trajectory is determined based on one or more sensors of the vehicle.

Example 72 is the controller of one of Examples 47 to 71, wherein the vehicle implements a mechanism configured to reorient the one or more seats based on a trajectory of the vehicle, wherein the mechanism is suspended in response to instruct the change of the position (e.g., the reorientation) and/or in response to determine when the predicted event occurs.

Example 73 is the controller of one of Examples 47 to 72, wherein the change of the position (e.g., the reorientation) is multidimensional (e.g., about and/or along at least two axes).

Example 74 is a controller, including: determine a predicted trajectory of a vehicle (e.g., being in an autonomous driving mode); provide an instruction for (e.g., instruct) an rotational reorientation of one or more seats of the vehicle based on the predicted trajectory (e.g., relative to a base of the vehicle), e.g. wherein the change of the position (e.g., the reorientation) includes one or more rotational movements of the one or more seats relative to a base of the vehicle. Optionally the change of the position (e.g., the reorientation) includes a change of position (e.g., a rotation) of the seat about a vertical axis of the vehicle and/or relative to a base of the vehicle. Optionally, a rotational set point of the change of the position (e.g., the reorientation) is based on the predicted trajectory.

Example 75 is the controller of Example 74, wherein the change of the position (e.g., the reorientation) is based on an acceleration force resulting from a curvature of the trajectory, e.g., on a direction of the acceleration force.

Example 76 is the controller of Example 74 or 75, wherein the predicted trajectory is determined based on sensor data of the vehicle.

Example 77 is a controller, including: determine an event in a vicinity of a vehicle and/or indicating a lack of attention of a driver of the vehicle (e.g., regarding the vicinity); provide an instruction for (e.g., instruct) one or more reorientations of a seat of the vehicle in response to the event, wherein the seat is occupied by the driver of the vehicle.

Example 78 is the controller of Example 77, wherein the one or more reorientations include multiple sequential reorientations causing a vibration of the seat; or wherein the one or more reorientations decrease a degree of comfort provided by the seat (e.g., change a reclining position of the seat).

Example 79 is the controller of one of Examples 47 to 78, wherein the change of the position (e.g., the reorientation) includes one or more rotational movements, e.g. about a vertical axis of the vehicle and/or relative to a base of the vehicle.

Example 80 is the controller of Example 79, wherein the rotational movement, includes a tilting movement, e.g. about a horizontal axis and/or relative to a base of the vehicle.

Example 81 is the controller of one of Examples 47 to 80, wherein the change of the position (e.g., the reorientation) includes a deformation of the one or more seats, e.g., a movement of a backrest (also referred to as reclination) and/or movement of an armrest of the one or more seats.

Example 82 is the controller of one of Examples 47 to 81, wherein provide the instruction for (e.g., instruct) the change of the position (e.g., the reorientation) indicates one or more actuators (e.g., of the vehicle, e.g., of the seat) configured to drive the change of the position (e.g., the reorientation).

Example 83 is the controller of one of Examples 47 to 82, wherein the change of the position (e.g., the reorientation), e.g., a set point of the change of the position (e.g., the reorientation), is instructed individually for each seat of the one or more seats.

Example 84 is the controller of one of Examples 47 to 83, wherein provide the instruction for (e.g., instruct) the change of the position (e.g., the reorientation) includes generate a message according to a communication protocol, the message including one or more parameters of the change of the position (e.g., the reorientation), e.g., a set point of the change of the position (e.g., the reorientation), a speed of the change of the position (e.g., the reorientation), and/or a direction of the change of the position (e.g., the reorientation).

Example 85 is the controller of one of Examples 47 to 84, wherein the determine is based on sensor data of the vehicle.

Example 86 is the controller of Example 85, wherein the sensor data represents the vicinity of the vehicle, e.g., one or more (stationary or moving) objects in the vicinity of the vehicle, e.g., traffic surrounding the vehicle.

Example 87 is the controller of one of Examples 47 to 86, wherein the determine is based on data received by the vehicle, e.g., via a mobile radio communication standard.

Example 88 is a controller, including one or more processors configured to: determine a spatial parameter of a predicted event, at which (e.g. a component of) a velocity of a vehicle is changed; provide an instruction for (e.g., instruct) a change of position (e.g., a rotation) of one or more seats of the vehicle, wherein a rotational set point of the change of the position (e.g., the reorientation) is based on the spatial parameter and based on a parameter representing an efficiency of an occupant-restraint system of the vehicle.

Example 89 is a controller, including one or more processors configured to: determine a temporal parameter of a predicted event, at which (e.g. a component of) a velocity of a vehicle is changed; provide an instruction for (e.g., instruct) an adjustment of one or more seats of the vehicle, wherein a set point of the adjustment is (e.g. determined) based on the temporal parameter.

Example 90 is a vehicle including one or more seats and the controller of one of Examples 47 to 89, wherein, for example, the one or more seats are mounted on a base of the vehicle and/or in a cabin of the vehicle, wherein, for example, the vehicle is an autonomous vehicle.

Example 91 is a safety system server external from the vehicle including the controller of one of Examples 47 to 89.

Example 92 is a controlling means, including: means for determining when a predicted event occurs, at which (e.g. one or more components of) a velocity of a vehicle is changed; means for providing an instruction for (e.g., instructing) a change of a position (e.g., a reorientation) of one or more seats of the vehicle based on when the predicted event occurs.

Example 93 is the controlling means of Example 92, wherein the change of the position (e.g., the reorientation), e.g., a set point of the change of the position (e.g., the reorientation), is further based on a parameter representing an efficiency of an occupant-restraint system of the vehicle, e.g., representing a spatial efficiency distribution of the occupant-restraint system.

Example 94 is the controlling means of Example 93, wherein the parameter representing the efficiency of the occupant-restraint system is a function (e.g., of a location) of where the predicted event occurs and/or of a physical distribution of the occupant-restraint system.

Example 95 is the controlling means of one of Examples 92 to 94, wherein the change of the position (e.g., the reorientation), e.g., a set point of the change of the position (e.g., the reorientation), is further based on a where of the predicted event occurs.

Example 96 is a controlling means, including: means for determining where a predicted event occurs, at which (e.g. a component of) a velocity of a vehicle is changed; means for providing an instruction for (e.g., instructing) a rotational reorientation (rotation) of one or more seats of the vehicle based on where a predicted event occurs and based on a parameter representing an efficiency of an occupant-restraint system of the vehicle.

Example 97 is the controlling means of Example 96, wherein the efficiency of the occupant-restraint system includes a spatial efficiency distribution of the occupant-restraint system.

Example 98 is the controlling means of Example 96 or 97, wherein the parameter representing the efficiency of the occupant-restraint system is a function (e.g., of a location) of where the event occurs and/or of a physical distribution of the occupant-restraint system.

Example 99 is the controlling means of one of Examples 96 to 98, wherein the change of the position (e.g., the reorientation), e.g., a set point of the change of the position (e.g., the reorientation), is further based on when the predicted event occurs.

Example 100 is the controlling means of one of Examples 92 to 99, wherein the change of the position (e.g., the reorientation), e.g., a set point of the change of the position (e.g., the reorientation), is further based on a parameter representing an execution speed of the change of the position (e.g., the reorientation), e.g., a rotation speed of the change of the position (e.g., the reorientation).

Example 101 is the controlling means of one of Examples 92 to 100, wherein the change of the position (e.g., the reorientation), e.g., a set point of the change of the position (e.g., the reorientation), is further based on an actual state (e.g. orientation and/or shape) of the one or more seats.

Example 102 is the controlling means of one of Examples 92 to 101, wherein the change of the position (e.g., the reorientation) includes a change of position (e.g., a rotation) of the one or more seats, e.g. about a vertical axis of the vehicle and/or relative to a base of the vehicle.

Example 103 is the controlling means of one of Examples 92 to 102, wherein the change of the position (e.g., the reorientation), e.g., a set point of the change of the position (e.g., the reorientation), defines a spatial orientation of the one or more seats to be achieved, e.g. regarding a vertical axis of the vehicle.

Example 104 is the controlling means of one of Examples 92 to 103, wherein a direction of the change of position (e.g., direction of rotation) of the change of the position (e.g., the reorientation) is based on a set point of reorientation and/or an actual state (e.g. orientation and/or shape) of the one or more seats.

Example 105 is the controlling means of one of Examples 92 to 104, further including: means for providing an instruction for (e.g., instructing) a deformation of the one or more seats in response to the predicted event occurs, e.g., based on when and/or where the predicted event occurs.

Example 106 is the controlling means of one of Examples 92 to 105, further including: means for providing an instruction for (e.g., instructing) an actuation of (e.g., triggering) one or more components of an occupant-restraint system of the vehicle in response to the predicted event and/or based on the instructed reorientation.

Example 107 is the controlling means of one of Examples 92 to 106, wherein the change of the position (e.g., the reorientation) is further based on an occupancy status of the one or more seats (e.g., frequently determined) and/or is based on a user customizable parameter.

Example 108 is the controlling means of Example 107, wherein an execution (e.g. rotation) speed of the change of the position (e.g., the reorientation) is based on the occupancy status of the one or more seats and/or is based on the user customizable parameter.

Example 109 is the controlling means of one of Examples 92 to 108, further including: means for providing an instruction for (e.g., instructing) a reconfiguration of an occupant-restraint system of the vehicle based on the change of the position (e.g., the reorientation) (e.g., its set point) and/or an occupancy status of the one or more seats.

Example 110 is the controlling means of Example 109, wherein the reconfiguration of the occupant-restraint system includes suspending or re-suspending one or more components (e.g., airbags) of the occupant-restraint system from actuation.

Example 111 is the controlling means of one of Examples 107 to 110, wherein the occupancy status represents one of the following: whether a seat is occupied by a child (e.g., unborn) or not (e.g., only an adult); whether an object occupying the seat is secured (e.g., attached, fastened, buckled) to the seat or unsecured therefrom; and whether a seat is occupied by a living object or a non-living object.

Example 112 is the controlling means of one of Examples 92 to 111, wherein the change of the position (e.g., the reorientation), e.g., a set point of the change of the position (e.g., the reorientation), is further based on a determined obstruction of the change of the position (e.g., the reorientation).

Example 113 is the controlling means of one of Examples 92 to 112, wherein determining when the predicted event occurs includes determining a time interval until the predicted event or the point of time of the predicted event.

Example 114 is the controlling means of one of Examples 92 to 113, wherein the predicted event includes a predicted collision of the vehicle or with the vehicle and/or the vehicle entering a curved section of a trajectory of the vehicle.

Example 115 is the controlling means of one of Examples 92 to 114, wherein the predicted event is determined based on a trajectory of one or more vehicles in a vicinity of the vehicle.

Example 116 is the controlling means of Example 115, wherein the trajectory is determined based on one or more sensors of the vehicle.

Example 117 is the controlling means of one of Examples 92 to 116, wherein the vehicle implements a mechanism configured to reorient the one or more seats based on a trajectory of the vehicle, wherein the mechanism is suspended in response to providing the instruction for (e.g., instructing) the change of the position (e.g., the reorientation) and/or in response to determining when the predicted event occurs.

Example 118 is the controlling means of one of Examples 92 to 117, wherein the change of the position (e.g., the reorientation) is multidimensional (e.g., about and/or along at least two axes).

Example 119 is a controlling means, including: means for determining a predicted trajectory of a vehicle (e.g., being in an autonomous driving mode); providing an instruction for (e.g., instructing) an rotational reorientation of one or more seats of the vehicle based on the predicted trajectory (e.g., relative to a base of the vehicle), e.g. wherein the change of the position (e.g., the reorientation) includes one or more rotational movements of the one or more seats relative to a base of the vehicle. Optionally the change of the position (e.g., the reorientation) includes a change of position (e.g., a rotation) of the seat about a vertical axis of the vehicle and/or relative to a base of the vehicle. Optionally, a rotational set point of the change of the position (e.g., the reorientation) is based on the predicted trajectory.

Example 120 is the controlling means of Example 119, wherein the change of the position (e.g., the reorientation) is based on an acceleration force resulting from a curvature of the trajectory, e.g., on a direction of the acceleration force.

Example 121 is the controlling means of Example 119 or 120, wherein the predicted trajectory is determined based on sensor data of the vehicle.

Example 122 is a controlling means, including: means for determining an event in a vicinity of a vehicle and/or indicating a lack of attention of a driver of the vehicle (e.g., regarding the vicinity); means for providing an instruction for (e.g., instructing) one or more reorientations of a seat of the vehicle in response to the event, wherein the seat is occupied by the driver of the vehicle.

Example 123 is the controlling means of Example 122, wherein the one or more reorientations include multiple sequential reorientations causing a vibration of the seat; or wherein the one or more reorientations decrease a degree of comfort provided by the seat (e.g., change a reclining position of the seat).

Example 124 is the controlling means of one of Examples 92 to 123, wherein the change of the position (e.g., the reorientation) includes one or more rotational movements, e.g. about a vertical axis of the vehicle and/or relative to a base of the vehicle.

Example 125 is the controlling means of Example 124, wherein the rotational movement, includes a tilting movement, e.g. about a horizontal axis and/or relative to a base of the vehicle.

Example 126 is the controlling means of one of Examples 92 to 125, wherein the change of the position (e.g., the reorientation) includes a deformation of the one or more seats, e.g., a movement of a backrest (also referred to as reclination) and/or movement of an armrest of the one or more seats.

Example 127 is the controlling means of one of Examples 92 to 126, wherein providing the instruction for (e.g., instructing) the change of the position (e.g., the reorientation) indicates one or more actuators (e.g., of the vehicle, e.g., of the seat) configured to drive the change of the position (e.g., the reorientation).

Example 128 is the controlling means of one of Examples 92 to 127, wherein the change of the position (e.g., the reorientation), e.g., a set point of the change of the position (e.g., the reorientation), is instructed individually for each seat of the one or more seats.

Example 129 is the controlling means of one of Examples 92 to 128, wherein providing the instruction for (e.g., instructing) the change of the position (e.g., the reorientation) includes generating a message according to a communication protocol, the message including one or more parameters of the change of the position (e.g., the reorientation), e.g., a set point of the change of the position (e.g., the reorientation), a speed of the change of the position (e.g., the reorientation), and/or a direction of the change of the position (e.g., the reorientation).

Example 130 is the controlling means of one of Examples 92 to 129, wherein the determining is based on sensor data of the vehicle.

Example 131 is the controlling means of Example 130, wherein the sensor data represents the vicinity of the vehicle, e.g., one or more (stationary or moving) objects in the vicinity of the vehicle, e.g., traffic surrounding the vehicle.

Example 132 is the controlling means of one of Examples 92 to 131, wherein the determining is based on data received by the vehicle, e.g., via a mobile radio communication standard.

Example 133 is a controlling means, including: means for determining a spatial parameter of a predicted event, at which (e.g. a component of) a velocity of a vehicle is changed; means for providing an instruction for (e.g., instructing) a change of position (e.g., a rotation) of one or more seats of the vehicle, wherein a rotational set point of the change of the position (e.g., the reorientation) is based on the spatial parameter and based on a parameter representing an efficiency of an occupant-restraint system of the vehicle.

Example 134 is a controlling means, including: means for determining a temporal parameter of a predicted event, at which (e.g. a component of) a velocity of a vehicle is changed; means for providing an instruction for (e.g., instructing) an adjustment of one or more seats of the vehicle, wherein a set point of the adjustment is (e.g. determined) based on the temporal parameter.

Example 135 is a vehicle including one or more seats and the controlling means of one of Examples 92 to 133, wherein, for example, the one or more seats are mounted on a base of the vehicle and/or in a cabin of the vehicle, wherein, for example, the vehicle is an autonomous vehicle.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A controller, comprising one or more processors configured to:
   receive environment variables of a vehicle from one or more sensors;
   predict a velocity changing event including event parameters based on the received environment variables, wherein the event parameters include a time of event and a location of event on the vehicle; and
   provide an instruction for a reorientation of one or more seats of the vehicle based on the time of event and the location of event on the vehicle.

2. The controller of claim 1,
   wherein the reorientation is further based on a parameter representing an efficiency of an occupant-restraint system of the vehicle.

3. The controller of claim 2,
   wherein the parameter representing the efficiency of the occupant-restraint system is a function of a location of where the velocity changing event occurs and/or of a physical distribution of the occupant-restraint system.

4. The controller of claim 1,
   wherein the reorientation is further based on a parameter representing an execution speed of the reorientation.

5. The method of claim 1,
   wherein the reorientation is further based on an actual orientation of the one or more seats.

6. The controller of claim 1,
   wherein the reorientation comprises a change of position of the one or more seats relative to a base of the vehicle.

7. The controller of claim 1,
   wherein the one or more processors further configured to:
   provide an instruction for an actuation of one or more components of an occupant-restraint system of the vehicle based on the instructed reorientation.

8. The controller of claim 1,
   wherein the reorientation is further based on an occupancy status of the one or more seats.

9. The controller of claim 8,
   wherein the occupancy status represents one of the following:
   whether a seat is occupied by a child or not;
   whether an object occupying the seat is secured to the seat or unsecured therefrom; and
   whether a seat is occupied by a living object or a non-living object.

10. The controller of claim 1,
    wherein the reorientation is further based on a determined obstruction of the reorientation.

11. The controller of claim 1,
    wherein the velocity changing event comprises a predicted collision of the vehicle or a predicted collision with the vehicle.

12. The controller of claim 1,
    wherein the velocity changing event comprises the vehicle entering a curved section of a trajectory of the vehicle.

13. The controller of claim 1,
    wherein the velocity changing event is determined based on a trajectory of one or more vehicles in a vicinity of the vehicle.

14. The controller of one of claim 1,
    wherein the reorientation is multidimensional.

15. The controller of one of claim 1,
    wherein instructing the reorientation indicates one or more actuators configured to drive the reorientation.

16. One or more non-transitory computer-readable media storing instructions thereon that, when executed by at least one processor, direct the at least one processor to:
    receive environment variables of a vehicle from one or more sensors;
    predict a velocity changing event including event parameters based on the received environment variables, wherein the event parameters include a time of event and a location of event on the vehicle; and
    provide an instruction for a reorientation of one or more seats of the vehicle based on the time of event and the location of event on the vehicle.

17. The non-transitory computer-readable media of claim 16,
    wherein the reorientation is further based on a parameter representing an efficiency of an occupant-restraint system of the vehicle.

18. A vehicle comprising one or more seats and a controller, the controller comprising one or more processors configured to:
    receive environment variables of a vehicle from one or more sensors;
    predict a velocity changing event including event parameters based on the received environment variables, wherein the event parameters include a time of event and a location of event on the vehicle; and
    provide an instruction for a reorientation of one or more seats of the vehicle based on the time of event and the location of event on the vehicle.

19. The vehicle of claim 18,
    wherein the reorientation is further based on a parameter representing an efficiency of an occupant-restraint system of the vehicle.

* * * * *